United States Patent
Kim et al.

(10) Patent No.: US 11,290,880 B2
(45) Date of Patent: *Mar. 29, 2022

(54) ELECTRONIC DEVICE

(71) Applicant: LG ELECTRONICS INC., Seoul (KR)

(72) Inventors: Sungjin Kim, Seoul (KR); Shinjae Kang, Seoul (KR); Jungsu Lee, Seoul (KR); Jiin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

This patent is subject to a terminal disclaimer.

(21) Appl. No.: 16/289,502

(22) Filed: Feb. 28, 2019

(65) Prior Publication Data

US 2019/0306709 A1    Oct. 3, 2019

(30) Foreign Application Priority Data

Feb. 28, 2018  (KR) .......................... 10-2018-0024832

(51) Int. Cl.
*H04W 12/06* (2021.01)
*H04L 29/06* (2006.01)
(Continued)

(52) U.S. Cl.
CPC ............ *H04W 12/06* (2013.01); *G06F 21/31* (2013.01); *G06F 21/316* (2013.01); *G06F 21/32* (2013.01);
(Continued)

(58) Field of Classification Search
CPC ... H04L 63/08; H04L 63/102; H04L 63/0861; H04L 63/083; H04L 63/082;
(Continued)

(56) References Cited

U.S. PATENT DOCUMENTS 6,715,083 B1 * 3/2004 Tovander ................ H04L 63/02
726/23
8,189,878 B2 * 5/2012 Schultz ................... G06F 21/32
382/115

(Continued)

FOREIGN PATENT DOCUMENTS

WO    2015047992    4/2015

OTHER PUBLICATIONS

J. Wannenburg and R. Malekian, "Physical Activity Recognition From Smartphone Accelerometer Data for User Context Awareness Sensing," in IEEE Transactions on Systems, Man, and Cybernetics: Systems, vol. 47, No. 12, pp. 3142-3149, Dec. 2017. (Year: 2017).*

(Continued)

*Primary Examiner* — Kari L Schmidt
(74) *Attorney, Agent, or Firm* — Lee Hong Degerman Kang & Waimey

(57) ABSTRACT

Disclosed is an electronic device including: an input unit provided with buttons; a plurality of sensors; and a controller configured to activate at least some of the plurality of sensors based on a received activation signal, generate authentication information based on at least one of the activated sensors, calculate a final security level score based on a security level score corresponding to the at least one authentication information, and determine whether a target service or a target external device is accessible, based on the calculated final security level score.

20 Claims, 38 Drawing Sheets

(51) Int. Cl.
*G06F 21/32* (2013.01)
*G06F 21/31* (2013.01)
*G06F 21/45* (2013.01)
*H04W 12/08* (2021.01)

(52) U.S. Cl.
CPC .............. *G06F 21/45* (2013.01); *H04L 63/08* (2013.01); *H04L 63/083* (2013.01); *H04L 63/0861* (2013.01); *H04L 63/102* (2013.01); *H04L 63/105* (2013.01); *H04L 63/107* (2013.01); *H04W 12/08* (2013.01); *G06F 2221/2111* (2013.01); *H04L 2463/082* (2013.01)

(58) Field of Classification Search
CPC ... H04L 2463/082; G06F 21/45; G06F 21/32; H04W 12/06; H04W 12/08
See application file for complete search history.

(56) References Cited

U.S. PATENT DOCUMENTS

| | | | | |
|---|---|---|---|---|
| 8,584,219 | B1* | 11/2013 | Toole | H04L 63/105 726/7 |
| 9,319,221 | B1* | 4/2016 | Awad | H04L 9/3231 |
| 10,586,030 | B2* | 3/2020 | Lee | G06K 9/00087 |
| 10,872,345 | B1* | 12/2020 | Walters | G06Q 20/3563 |
| 10,970,515 | B2* | 4/2021 | Jin | G06K 9/00087 |
| 2004/0164848 | A1* | 8/2004 | Hwang | G06F 21/32 340/5.82 |
| 2005/0069179 | A1* | 3/2005 | Hwang | G06K 9/036 382/124 |
| 2006/0120575 | A1* | 6/2006 | Ahn | G06K 9/036 382/124 |
| 2007/0288748 | A1* | 12/2007 | Kakiuchi | G06F 21/32 713/159 |
| 2009/0141948 | A1* | 6/2009 | Nakaoka | H04M 1/667 382/118 |
| 2009/0165125 | A1* | 6/2009 | Brown | G06F 21/31 726/21 |
| 2009/0199264 | A1* | 8/2009 | Lang | G06F 21/57 726/1 |
| 2009/0288147 | A1* | 11/2009 | Yeung | G06F 21/84 726/4 |
| 2011/0013812 | A1* | 1/2011 | Shin | G07C 9/37 382/118 |
| 2012/0159590 | A1* | 6/2012 | Novack | G06F 21/32 726/7 |
| 2012/0266231 | A1* | 10/2012 | Spiers | H04L 67/10 726/12 |
| 2013/0227651 | A1* | 8/2013 | Schultz | H04L 63/0861 726/4 |
| 2014/0020090 | A1* | 1/2014 | Nada | G06F 21/32 726/19 |
| 2014/0075178 | A1* | 3/2014 | Trethewey | G06F 1/3206 713/100 |
| 2014/0294259 | A1* | 10/2014 | Lee | G06F 21/32 382/124 |
| 2014/0331293 | A1 | 11/2014 | Toole et al. | |
| 2014/0354406 | A1* | 12/2014 | Fyke | H04L 63/0861 340/5.83 |
| 2014/0359722 | A1 | 12/2014 | Schultz et al. | |
| 2014/0366111 | A1* | 12/2014 | Sheller | G06F 21/31 726/7 |
| 2015/0067827 | A1* | 3/2015 | Lim | G06F 21/32 726/19 |
| 2015/0089585 | A1 | 3/2015 | Novack | |
| 2015/0242605 | A1 | 8/2015 | Du et al. | |
| 2015/0261972 | A1* | 9/2015 | Lee | G06F 21/6218 713/165 |
| 2015/0310259 | A1* | 10/2015 | Lau | G06K 9/00288 382/118 |
| 2015/0310444 | A1* | 10/2015 | Chen | G06Q 20/3226 705/44 |
| 2015/0312531 | A1* | 10/2015 | Samad | H04N 7/186 348/143 |
| 2016/0063503 | A1* | 3/2016 | Kobres | H04L 63/102 705/18 |
| 2016/0071111 | A1* | 3/2016 | Wang | G06Q 30/0643 705/44 |
| 2016/0147987 | A1* | 5/2016 | Jang | G06F 21/32 726/19 |
| 2016/0180068 | A1* | 6/2016 | Das | G06F 21/316 726/7 |
| 2017/0104861 | A1* | 4/2017 | Kang | G06K 9/00771 |
| 2017/0116457 | A1* | 4/2017 | Eltoft | G06F 3/0418 |
| 2018/0063128 | A1* | 3/2018 | Korus | H04L 63/083 |
| 2018/0159852 | A1* | 6/2018 | Crabtree | H04L 63/105 |
| 2019/0372968 | A1* | 12/2019 | Balogh | H04L 63/0861 |
| 2020/0175143 | A1* | 6/2020 | Lee | H04M 1/0266 |
| 2020/0184056 | A1* | 6/2020 | Thornblom | G06F 21/602 |

OTHER PUBLICATIONS

J. Zhu, P. Wu, X. Wang and J. Zhang, "SenSec: Mobile security through passive sensing," 2013 International Conference on Computing, Networking and Communications (ICNC), 2013, pp. 1128-1133. (Year: 2013).*

Hayashi, Eiji, et al. "Casa: context-aware scalable authentication." Proceedings of the Ninth Symposium on Usable Privacy and Security. 2013, pp. 1-10. (Year: 2013).*

PCT International Application No. PCT/KR2019/002441, International Search Report dated Jun. 24, 2019, 3 pages.

* cited by examiner (a)

(b)

(c)

(a)

(b)

(c)

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2018-0024832, filed on Feb. 28, 2018, the contents of which are hereby incorporated by reference herein in its entirety.

BACKGROUND OF THE INVENTION

1. Field of the Invention

The present invention relates to an electronic device and, more particularly, to an electronic device that is capable of easily accessing a target service or a target external device through multi-factor authentication.

2. Description of the Related Art

To use a particular service with an electronic device, authentication information is required to use the corresponding service.

Recently, a variety of authentication methods, such as authentication via iris recognition, face recognition or fingerprint recognition, have been employed in mobile terminals.

In the case where iris recognition is used, an iris recognition rate is reduced in the presence of direct sunlight.

In addition, in the case where face recognition is used, a face recognition rate is reduced in a dark place.

Meanwhile, in order to execute services with an electronic device, different types of authentication information are required for the respective service and a user needs to perform authentication each time.

SUMMARY OF THE INVENTION

The present invention provides an electronic device capable of easily accessing a target service or target external device through multi-factor authentication.

The present invention also provides an electronic device that is capable of being used to access a variety of services or an external device with a final security level score calculated through multi-factor authentication.

In one general aspect of the present invention, the above and other objects can be accomplished by the provision of an electronic device including: an input unit provided with buttons; a plurality of sensors; and a controller configured to activate at least some of the plurality of sensors based on a received activation signal, generate authentication information based on at least one of the activated sensors, calculate a final security level score based on a security level score corresponding to the at least one authentication information, and determine whether a target service or a target external device is accessible, based on the calculated final security level score.

In another general aspect of the present invention, the above and other objects can be accomplished by the provision of an electronic device including: an input unit provided with buttons; a plurality of sensors; and a controller configured to, when a current final security level score is smaller than a first security level score required by a target service or a target external device, activate at least some of inactive sensors, generate at least one authentication information based on the activated sensors, calculate a second final security level score using the at least one authentication information, and determine whether the target service or the target external device is accessible, based on the calculated second final security level score.

An electronic device according to an embodiment of the present invention includes: an input unit provided with buttons; a plurality of sensors; and a controller configured to activate at least some of the plurality of sensors based on a received activation signal, generate authentication information based on at least one of the activated sensors, calculate a final security level score based on a security level score corresponding to the at least one authentication information, and determine whether a target service or a target external device is accessible, based on the calculated final security level score. Accordingly, it is possible to easily access the target service or the target external device through multi-factor authentication.

In this case, the activation signal may include at least one of an input signal from the input unit, a sensing signal from a touch sensor, a GPS sensor, or an inertial sensor among the plurality of sensors, or a sensing signal from a microphone among the plurality of sensors. Accordingly, at least some of the plurality of sensors may be activated to thereby easily access a target service or a target external device through multi-factor authentication.

In addition, since a final security level score calculated through multi-factor authentication is used to access a variety of services or an external device, an authentication process may become easy and simple.

Meanwhile, in response to occurrence of an event, a control operation is performed so as to activate at least one of the plurality of sensors or generate authentication information based on a sensing signal from the activated sensor. Accordingly, while supply power is used efficiently, it is possible to easily access a target service or a target external device through multi-factor authentication.

Meanwhile, as a security level score for authentication information is changed based on time lapse or occurrence of an event, a final security level score may be updated in real time. Thus, it is possible to easily access a target service or a target external device through multi-factor authentication.

Meanwhile, when a calculated final security level score is smaller than a first security level score required by a target service or a target external device, a control operation is performed to output a message for requesting additional authentication information, thereby inducing the additional authentication.

Meanwhile, a control operation is performed to reduce a security level score for authentication information after a predetermined time or sequentially over time so as to update the final security level score in real time.

Meanwhile, if received at least one authentication information does not coincide with authentication information stored in a memory, a control action may be performed to reset a security level score for the corresponding authentication information or reset a calculated final security level score, thereby enhancing security of the authentication information.

Meanwhile, an image captured by a camera out of a plurality of sensors is transmitted to a predetermined external device at a time of resetting a security level score or a final security level score, and accordingly, a designated device or a designated user is able to immediately recognize an authentication error occurred due to an access attempt by an unauthorized user.

Meanwhile, an electronic device according to another embodiment of the present invention includes: an input unit provided with buttons; a plurality of sensors; and a controller configured to, when a current final security level score is smaller than a first security level score required by a target service or a target external device, activate at least some of the plurality of sensors based on a received activation signal, generate authentication information based on at least one of the activated sensors, calculate a final security level score based on a security level score corresponding to the at least one authentication information, and determine whether a target service or a target external device is accessible, based on the calculated final security level score. Accordingly, it is possible to easily access the target service or the target external device through multi-factor authentication.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Hereinafter, the present invention will be described in more detail with reference to the accompanying drawings.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

Figure 1:
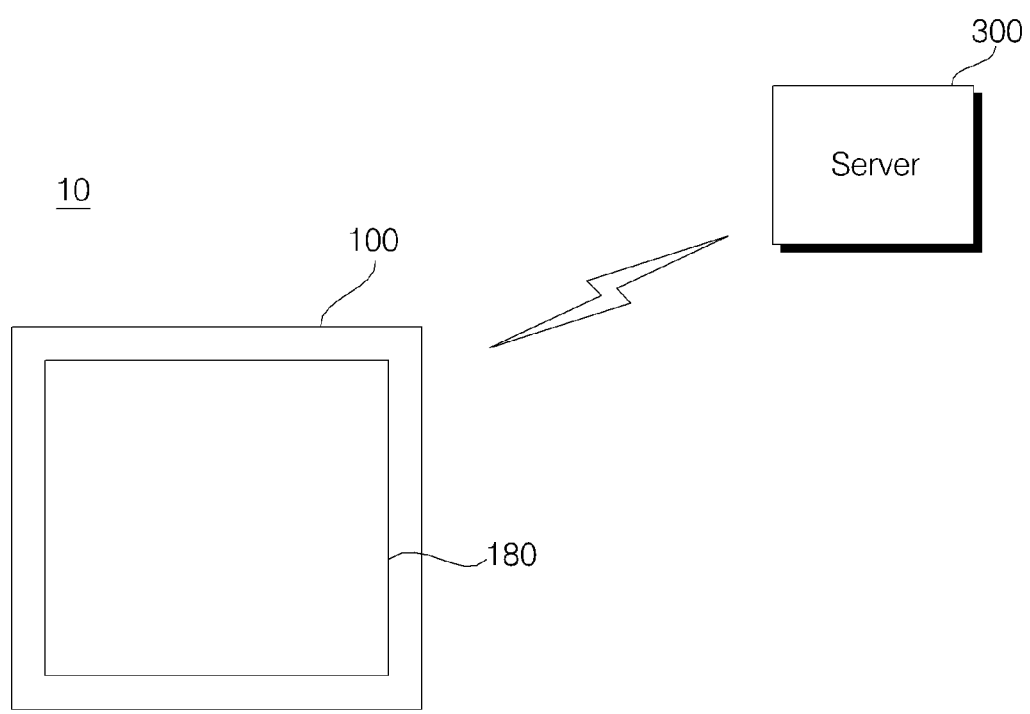
FIG. 1 is a diagram illustrating an authentication system according to an embodiment of the present invention.

FIG. 1 is a diagram illustrating an authentication system according to an embodiment of the present invention.

Referring to the drawings, an authentication system 10 in FIG. 1 is an authentication device using an electronic device, and may include an electronic device 100 and a server 300.

When executing a Web login service, a payment service, and the like, the electronic device 100 may transmit authentication information, a data transmission request, and the like to an external server 300. Based on the authentication information, the external service 300 may transmit data to the electronic device 100 in response to the data transmission request. Accordingly, the electronic device 100 may display a screen related to the corresponding service based on the received data.

Meanwhile, in the case of executing the web login service, the payment service, and the like, the electronic device 100 according to an embodiment of the present invention may activate at least some of a plurality of sensors based on an activation signal, generate authentication information based on activated sensors, generate at least one authentication information based on at least some of multiple sensors in the electronic device 100, calculate a final security level score based on a security level score corresponding to the at least one authentication information, and determine, based on the calculated final security level score, whether a target service or a target external device is accessible.

Meanwhile, a security level score may be a matching score. The matching score may be information related to a degree of matching (a similarity level) between user information and authentication information.

In this case, the activation signal may include an input signal from the input unit 130, a sensing signal from a touch sensor, a GPS sensor, or an inertial sensor among the plurality of sensors, and a voice signal from a microphone among the plurality of sensors.

Meanwhile, the activation signal may include an input signal for executing a first service.

Specifically, the electronic device 100 may receive security level information required for the Web login service or the payment service, and compare a calculated final security level score with a received security level score required by the web login service or the payment service. When the calculated security level score is greater than the required security level score, the electronic device 100 may determine that the web login service or the payment service is accessible.

If a particular application (e.g., a banking application) is executed in the electronic device, an activation signal may be output.

When it is determined that the target service or the target external device is accessible, the electronic device 100 may transmit a data transmission request to the server 300. In response to the data transmission request, the server 300 may transmit data to the electronic device 100. Accordingly, the electronic device 100 may display a screen related to a corresponding service based on the received data.

In this manner, it is possible to easily access a target service or a target external device through multi-factor authentication.

In addition, since a variety of services or external devices are able to be accessed using a final security level score calculated through multi-factor authentication, it is possible to make authentication easy and convenient.

In another example, the electronic device 100 may transmit a calculated final security level score to the server 300, and the server 300 determines whether a web login service or a payment service is accessible. When the web login service or the payment service is accessible, the server 300 may transmit data to the electronic device 100. Accordingly, the electronic device 100 may display a screen related to a corresponding service based on the received data.

Meanwhile, the server 300 may be any of servers provided by various service providers or a server provided by a manufacturer of the electronic device 100.

Meanwhile, the electronic device 100 may output a message for requesting additional authentication, when a calculated final security level score is smaller than a first security level score required by a target service or a target external device. Accordingly, additional authentication may be performed.

Meanwhile, the electronic device 100 according to an embodiment of the present invention may be a device which needs to perform authentication and includes having a plurality of sensors for acquiring authentication information.

The plurality of sensors may include at least two of a camera, a fingerprint sensor, a microphone, an inertial sensor, a touch sensor, or an illumination sensor.

For example, the electronic device 100 may be a mobile terminal such as a smart phone, a wearable device such as a smart watch, a table PC, a laptop, a computer, a TV, a refrigerator, a washing machine, an air conditioner, a drier, an air purifier, a robot cleaner, a moving robot, a vehicle, a drone, an electronic door, and the like.

Figure 2:
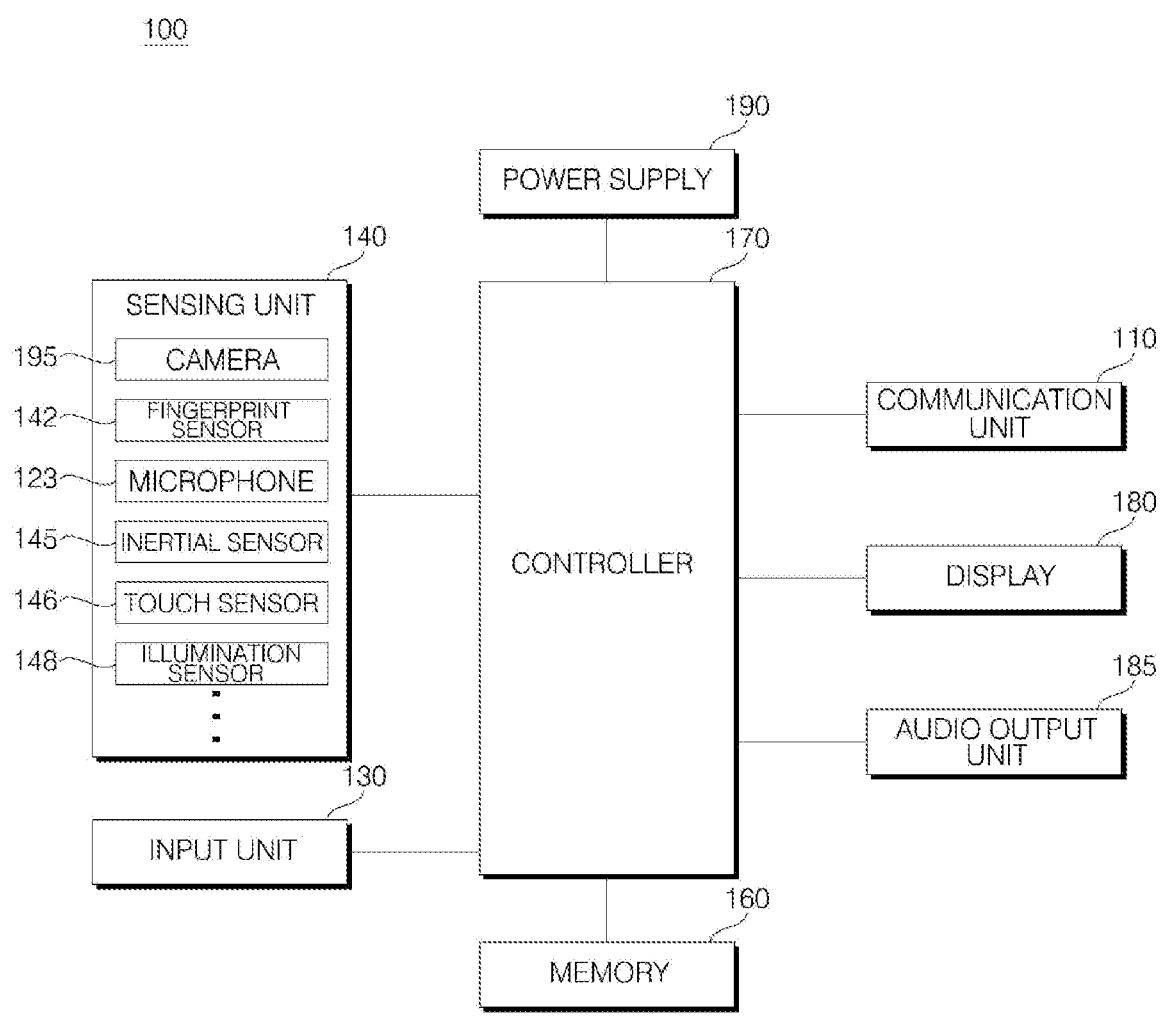
FIG. 2 is an example of a block diagram of the electronic device of FIG. 1.

FIG. 2 is an example of a block diagram of the electronic device of FIG. 1.

Referring to the drawing, the electronic device 100 may include a communication unit 110, an input unit 130, a sensing unit 140, a memory 160, a controller 170, a display 180, an audio output unit 185, and a power supply 190.

When these components are actually implemented, two or more components may be combined into one or one component may be divided into two or more.

The communication unit 110 may provide an interface for communication with an external device. To this end, the communication unit 110 may include at least one of a mobile communication module (not shown), a wireless Internet module (not shown), a short-range communication module (not shown), or a GPS module (not shown).

For example, the communication unit 110 may perform IR communication, Bluetooth communication, Wi-Fi communication, or the like to exchange data with a paired external electronic device (e.g., a mobile terminal or a vehicle) or transmit data.

The input unit 130 may include a physical button, a soft button, and the like for initializing the electronic device or inputting an operation.

The sensing unit 140 may include a plurality of sensors.

The plurality of sensors may include a camera 195, a fingerprint sensor 142, a microphone 123, an inertial sensor 145, a touch sensor 146 implemented as a touch pad or a touch screen, an illumination sensor 148, and the like.

The camera 195 may be a concept including a camera for acquiring a visible-light image or an IR camera for acquiring an IR band image.

The fingerprint sensor 142 is a sensor for acquiring a fingerprint image. The fingerprint sensor 142 may be disposed in a particular button of the input unit 130 or may be embedded in part of the front frame or the rear frame of the electronic device 100.

The microphone 123 may be disposed to sense an audio signal.

The inertial sensor 145 may include an accelerometer, a gyro sensor, a gravity sensor, and the like. For example, the accelerometer, the gyro sensor, the gravity sensor, and the like may include a six-component sensor.

The inertial sensor 145 may output motion information of the electronic device 100, for example, movement information (acceleration information, angular velocity information) or location information with reference to X, Y, and Z axes.

The illumination sensor 148 may sense ambient illumination of the electronic device 100, and output a sensed signal.

In addition, the sensing unit 140 may further include a variety of sensors for acquiring a user's biometric information.

For example, the sensing unit 140 may further include a blood pressure sensor, a brainwave sensor, and the like.

The memory 160 may store a program for processing or controlling operations of a controller 170 in the electronic device 100, or may implement a function of temporarily storing input/output data.

The controller 170 may control operation of each unit in the electronic device 100 so as to control overall operations of the electronic device 100.

The display 180 may display diverse information of an image, and, to this end, the display 180 may include a Liquid Crystal Display (LCD) panel, an organic light emitting panel, a Light Emitting Diode (LED) panel, or the like.

The audio output unit 185 may output an audio signal processed by the controller 170 in the electronic device 100.

Alternatively, the audio output unit 185 may output guidance information regarding operation of the electronic device 100 in the form of an audio signal.

Under the control of the controller 170, the power supply 190 may supply power required to operate each component.

In particular, the power supply 190 may include a battery (not shown) for storing and outputting direct current (DC) power.

Figure 3:
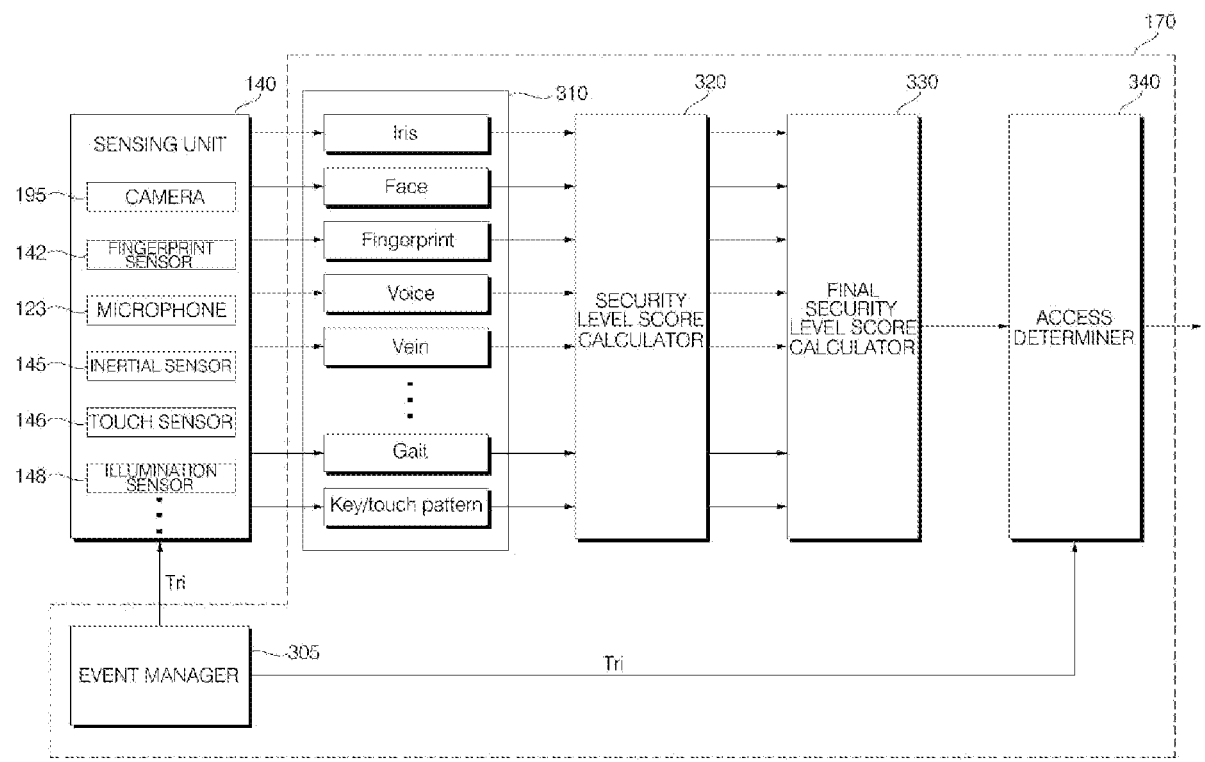
FIG. 3 is an inner block diagram of a controller of FIG. 2.

FIG. 3 is an inner block diagram of the controller of FIG. 2.

Referring to the drawing, the controller 170 may receive a sensing signal from the sensing unit 140, and generate authentication information based on the received sensing signal.

To this end, the controller 170 may include an event manager 305, an authentication information generator 310, a security level score calculator 320, a final security level score calculator 330, and an access determiner 340.

The event manager 305 may manage an event that has occurred.

In one example, when the electronic device 100 is moved in a standby mode, an event of finishing the standby mode and entering the operation mode may occur.

In this case, the event manager 305 may trigger an operation mode entrance event based on a motion signal from the sensing unit 140.

In another example, if a first button of the input unit 130 is operated while the electronic device 100 is in the operation mode, the event manager 305 may cause an event for providing a first service by a first button to occur. For example, the first button may be a home button, and providing a first service may be providing a home screen service.

In yet another example, if an audio signal is collected through the microphone 123 of the sensing unit 140 while the electronic device 100 is in the standby mode or the operation mode, an event corresponding to the collected audio signal may occur.

For example, when sound including a key word or a natural language, such as "weather", "traffic information", "play music", and "payment", is collected through the microphone 123, the event manager 305 may trigger a weather information provision event, a traffic information provision event, a music provision event, a payment event, and the like.

In yet another example, when a final security level score of the electronic device 100 is smaller than a security level score required for a target service, the event manager 305 may trigger an event for security authentication.

Specifically, the event manager 305 may trigger an event for activating a sensor remaining inactive out of a plurality of sensors in the sensing unit 140. Such an event may be referred to as a trigger event.

Meanwhile, when a sensing value of a first sensor being activated among the plurality of sensors is equal to or smaller than a first reference value, the event manager 305 may activate at least one of other sensors, except the first sensor.

To this end, the event manager 305 may output an activation signal Tri to the sensing unit 140.

For example, when a sensing value of the illumination sensor 148 being activated is equal to or smaller than the first reference value, the ambient illumination is dark. Thus, even though a camera is activated, it is not possible to acquire an image with good quality.

Thus, the event manager 305 may perform control such that the microphone 123, the fingerprint sensor 142, or the touch sensor 146 is activated.

Meanwhile, when a sensing value of the first sensor being activated among the plurality of sensors is equal to or greater than a second reference value or when an input signal is received from the input unit 130, the event manager 305 may activate at least one of other sensors, except the first sensor.

For example, when a peak level of sound collected through the microphone 123 being activated is equal to or greater than the second reference value due to loud ambient sound, it is not easy to extract a user's voice.

Thus, the event manager 305 may perform control such that the camera 195, the fingerprint sensor 142, or the touch sensor 146 is activated.

Meanwhile, the event manager 305 may output a trigger signal Tri to the sensing unit 140 based on an input activation signal.

The activation signal may be an input signal from the input unit 130, a sensing signal from the touch sensor 146 or the inertial sensor 145 in the sensing unit 140, or a voice signal from the microphone 123.

The sensing unit 140 may activate an inactive sensor based on the trigger signal Tri.

Meanwhile, the event manager 305 may output the trigger signal Tri to the access determiner 340.

Accordingly, the access determiner 340 may compare a final security level score of the current time and a security level score required by a target service, and determine whether the target service is accessible.

Meanwhile, when a sensing value of the first sensor being activated among the plurality of sensors is equal to or greater than the second reference value or when an input signal is received from the input unit 130, the event manager 305 may perform control such that at least one of other sensors, except for the first sensor, is activated.

Meanwhile, when a calculated final security level score is smaller than a first security level score required by a target service or a target external device, the event manager 305 may output a message for requesting additional authentication information.

The authentication information generator 310 may generate authentication information based on a sensing signal from each of the multiple sensors in the sensing unit 140.

In response to occurrence of an event, the authentication information generator 310 may generate authentication information based on a sensing signal from a pre-activated sensor.

For example, the authentication information generator 310 may generate iris authentication information based on an image captured by the camera 195.

In another example, the authentication information generator 310 may generate face authentication information based on an image captured by the camera 195.

Meanwhile, the authentication information generator 310 may generate fingerprint authentication information based on an image captured by the fingerprint sensor 142.

Meanwhile, the authentication information generator 310 may generate glottal authentication information or voice recognition information based on a user's voice acquired through the microphone 123.

Meanwhile, the authentication information generator 310 may generate usage pattern authentication information based on a sensing signal from the touch sensor 146.

Meanwhile, the authentication information generator 310 may generate location authentication information based on a sensing signal acquired through the inertial sensor 145 or a GPS sensor (not shown).

Meanwhile, the authentication information generator 310 may generate illumination authentication information based on a sensing signal acquired through the illumination sensor 148.

The security level score calculator 320 may calculate a security level score for each authentication information generated by the authentication information generator 310.

Meanwhile, the security level score for each authentication information generated by the authentication generator 310 may be pre-stored in the memory 160.

For example, a security level score for iris authentication information may be set to Level 9, a security level score for fingerprint authentication information may be set to Level 5, a security level score for face authentication information may be set to Level 3, a security level score for voice authentication information may be set to Level 2, a security level score for usage pattern authentication information may be set to Level 1, and a security level score for location authentication information may be set to Level 0.5. These security level scores may be stored in the memory 160.

As such, in an embodiment of the present invention, a security level score may be set differently depending on a type of authentication information.

Meanwhile, the security level score calculator 320 may perform control such that a security level score for authentication information is changed based on time lapse or occurrence of an event.

Meanwhile, after generating authentication information, the security level score calculator 320 may reduce a security level score for the authentication information over time.

In particular, after receiving authentication information, the security level score calculator 320 may reduce a security level score for the authentication information after a predetermined time or sequentially over time.

In one example, the security level score calculator 320 may first set a security level score for iris authentication information to Level 9, and reduce the security level to Level 7 after 5 minutes and then to Level 5 after 10 minutes.

In another example, the security level score calculator 320 may first set a security level score for fingerprint authentication information to Level 5, and reduce the security level score to Level 4 after 5 minutes and then to Level 3 after 10 minutes.

As such, depending on a type of authentication information, a security level score for the authentication information may be reduce by a different degree over time.

Meanwhile, based on a sensing signal generated by an activated sensor, the security level score calculator 320 may generate corresponding authentication information.

The final security level score calculator 330 may calculate a final security level score based on authentication information received from the security level score calculator 320.

The final security level score calculator 330 may calculate a final security level score based on a plurality of authentication information received from the security level score calculators 320.

Meanwhile, depending on a situation, the final security level score calculator 330 may calculate a final security level score based on one authentication information received from the security level score calculator 320.

In one example, the final security level score calculator 330 may calculate a final security level score by summing up a plurality of authentication information received from the security level score calculator 320.

In another example, the final security level score calculator 330 may calculate a final security level score by assigning different weights to the plurality of authentication information received from the security level score calculator 320.

For instance, in the case where fingerprint authentication information occurs more frequently than iris authentication information, the final security level score calculator 330 may determine that a user usually use the fingerprint authentication information. Then, the final security level score calculator 330 may assign a higher weight to the fingerprint authentication information than the iris authentication information, and calculate a final security level score by summing all the authentication information according to the assigned weight.

Meanwhile, the final security level score calculator 330 may perform control such that a final security level score is changed based on time lapse or occurrence of an event.

Meanwhile, after generating a final security level score, the final security level score calculator 330 may reduce the final security level score over time.

In particular, after calculating a final security level score, the final security level score calculator 330 may reduce the final security level score after a predetermined time or sequentially over time.

Based on a final security level score calculated by the final security level score calculator 330, the access determiner 340 may determine whether a target service or a target external device is accessible.

For example, the access determiner 340 may receive security level information required for a web login service or a payment service, and compare a calculated final security level score with a received security level score required by the web login service or the payment service. When the calculated final security level score is greater than the required security level score, the access determiner 340 may determine that the web login service or the payment service is accessible.

When it is determined that a target service or a target external device is accessible, the access determiner 340 may transmit a data transmission request to the server 300. In response to the data transmission request, the server 300 may transmit data to the electronic device 100.

Accordingly, the electronic device 100 may display a screen related to a corresponding service based on the received data.

Accordingly, it is possible to easily access the target service or the target external device through multi-factor authentication.

Meanwhile, when the calculated final security level score is smaller than the security level score of the web login service or the payment service, the access determiner 340 may determine that additional authentication is necessary for the web login service or the payment service, and transmit information about a request for additional authentication to the event manager 305 or the sensing unit 140.

Accordingly, it is possible to activate a sensor remaining inactive in the sensing unit 140.

Meanwhile, when the calculated final security level score is smaller than a first security level score required by a target service or a target external device, the controller 170 may output a message for requesting additional authentication information.

Meanwhile, when the calculated final security level score is smaller than a first security level score required by the target service or the target external device, the controller 170 may activate a first sensor remaining inactive in a plurality of sensors and generate additional authentication information based on the activated first sensor. Further based on the additional authentication information, the controller 170 may calculate a second final security level score. Based on the second final security level score, the controller 170 may determine whether the target service or the target external device is accessible.

Meanwhile, when the calculated final security level score is smaller than the first security level score required by the target service or the target external device, the controller 170 may output indicator items to guide selection of a plurality of authentication information. If one of the indicator items is selected, the controller 170 may activate a sensor or authentication information corresponding to the selected indicator item. Based on the activated sensor or the activated authentication information, the controller 170 may generate additional authentication information. Further based on the additional authentication information, the controller 170 may calculate a second final security level score. Based on the second final security level score, the controller 170 may determine whether the target service or the target external device is accessible.

Meanwhile, when the second final security level score is equal to or greater than the first security level score required by the target service or the target external device, the controller 170 may access to the target service or the target external device.

Meanwhile, during the access to the target service or the target external device, the controller 170 may receive relevant data from a service provider or an external device, and perform control such that display a screen related to the target service or the target external device.

Meanwhile, when the calculated final security level score is equal to or greater than the first security level score required by the target service or the target external device, the controller 170 may access to the target service or the target external device.

During the access to the target service or the target external device, the controller 170 may receive relevant data from a service provider or an external device and display a screen related to the target service or the target external device.

Meanwhile, when the calculated final security level score is equal to or greater than the first security level score required by the target service or the target external device, the controller 170 may transmit a data transmission request to a provider of the target service or to the target external device or the provider or the target external device is controlled to transmit authentication data. Then the controller 170 may receive relevant data from the provider or the target external device and display a screen related to the target service or the target external device.

Meanwhile, the controller 170 may perform control such that a security level score for authentication information is reduced after a predetermined time or sequentially over time.

Meanwhile, the controller 170 may compare received at least one authentication information received with authentication information stored in the memory 160. When the received at least authentication information coincides with the authentication information stored in the memory 160, the controller 170 may calculate a final security level score based on the corresponding authentication information. Based on the calculated final security level score, the controller 170 may determine whether the target service or the target external device is accessible.

Meanwhile, the controller 170 may compare received at least one authentication information and authentication information stored in the memory 160. When the received at least one authentication information coincides with the authentication information stored in the memory 160, the controller 170 may perform control such that a security level score of the corresponding authentication information is reset or a calculated final security level score is reset.

Meanwhile, when resetting a security level score or a final security level score, the controller 170 may perform control such that an image captured by a camera among a plurality of sensors is transmitted to a predetermined external device.

Meanwhile, based on the calculated final security level score, the controller 170 may perform control such that recommendation information about an executable service or a remote controllable external device is provided.

Meanwhile, when an input signal is received from the input unit 130, when a sensing signal from an inertial sensor or a sensing signal from a touch sensor is equal to or greater than a first reference value, when a sensing signal from an illumination sensor is equal to or smaller than a second reference value, or when a level of sound output from a microphone 123 is equal to or greater than a third reference value, the controller 170 may generate a trigger signal.

FIGS. 4A to 4E are diagrams illustrating various examples of the electronic device shown in FIG. 1.

Figure 4A:
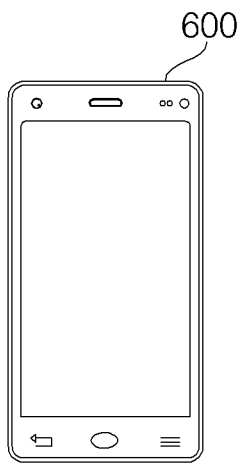
FIGS. 4A to 4E are diagrams illustrating various examples of the electronic device shown in FIG. 1.

FIG. 4A shows a mobile terminal 600 like a smart phone as an example of an electronic device. Meanwhile, similarly to the drawing, a wearable device such as a smart watch, a tablet PC, and the like are applicable.

Figure 4B:
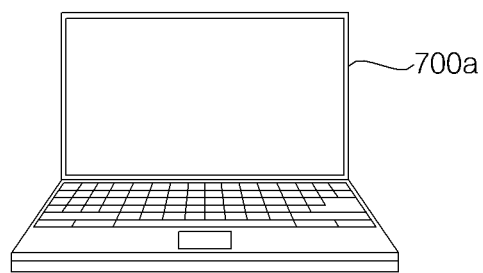

FIG. 4B shows a laptop 700a as an example of an electronic device. Meanwhile, similarly to the drawing, a computer and the like are applicable.

Figure 4C:
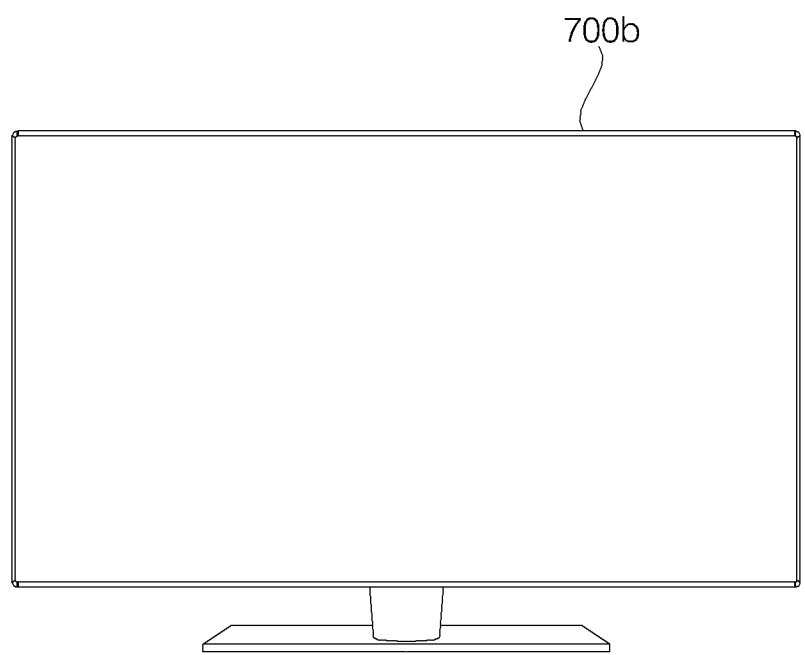
Figure 4C:
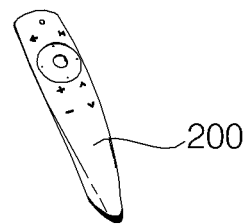

FIG. 4C shows a remote controllable TV 700b controlled by a remote control device 200, as example of an electronic device.

Figure 4D:
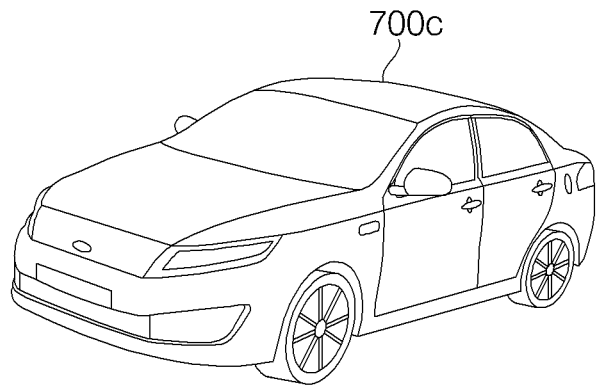
Figure 4D:
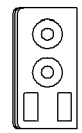

FIG. 4D shows a vehicle 700c as an example of an electronic device. Meanwhile, similarly to the drawing, a movable robot cleaner, a moving robot, a drone, and the like may be applicable.

Figure 4E:
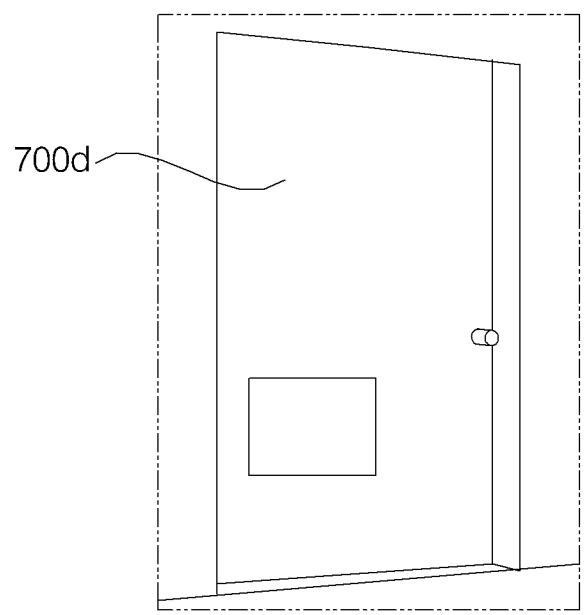

FIG. 4E shows an electronic door 700d as an example of an electronic device. Similarly to the drawing, a refrigerator, a washing machine, an air conditioner, a drier, an air conditioner, a cooking appliance, or any other home appliance may be applicable.

Figure 5A:
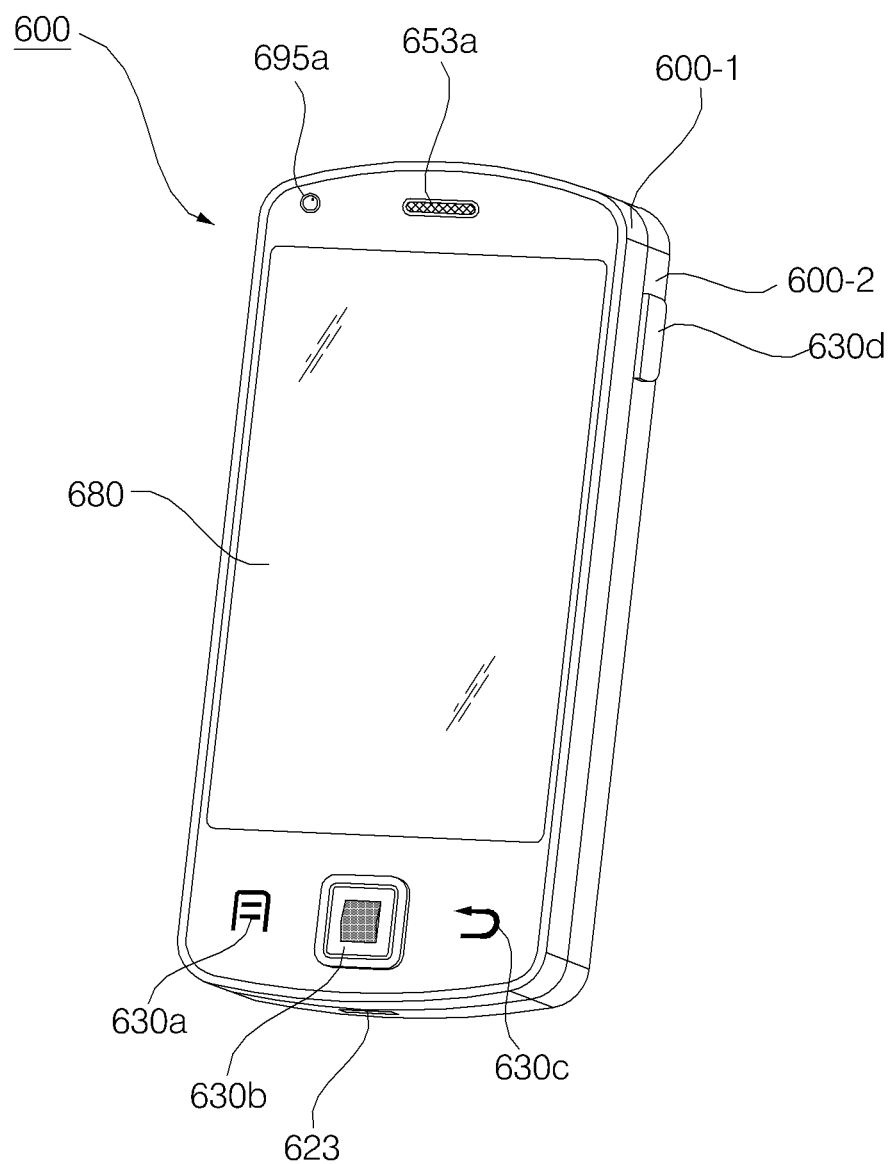
FIG. 5A is a front perspective view of a mobile terminal which is an example of an electronic device according to an embodiment of the present invention.
Figure 5B:
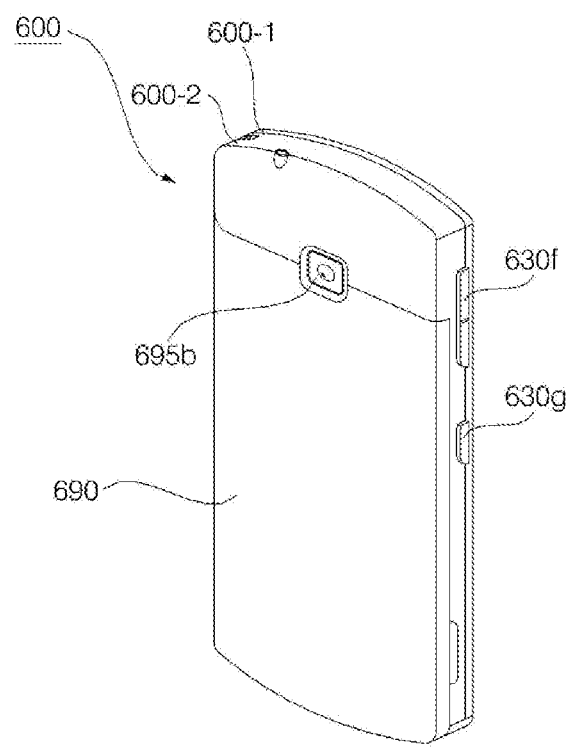
FIG. 5B is a rear perspective view of the mobile terminal shown in FIG. 5A.

FIG. 5A is a front perspective view of a mobile terminal which is an example of an electronic device according to an embodiment of the present invention. FIG. 5B is a rear perspective view of the mobile terminal shown in FIG. 5A.

Referring to FIG. 5A, a case defining the exterior appearance of the mobile terminal 600 is formed by a front case 600-1 and a rear case 600-2. A variety of electronic components may be embedded in a space formed by the front case 600-1 and the rear case 600-2.

Specifically, a display 680, a first audio output module 653a, a first camera 695a, a first button 630a, a second button 630b, and a third button 630c may be disposed on the front case 600-1. In addition, a fourth button 630d, a fifth button 630e, a first microphone 623a, a second microphone 623b, and a third microphone 623c may be disposed on a side surface of the rear case 600-2.

A touch pad forms a layered structure with the display 680, and therefore, the display 680 may operate as a touch screen.

The first audio output module 653a may be implemented in the form of a receiver or a speaker. The first camera 695a may be implemented in a form suitable for photographing an image or a video about a user or the like. In addition, a microphone 623 may be implemented in a form appropriate to receive a user's voice and any other sound.

The aforementioned first to fifth buttons 630a to 630e, and sixth and seventh buttons 630f and 630g may be called a user input unit 630.

The first microphone 623a and the second microphone 623b may be disposed in an upper side of the rear case 600-2, that is, an upper side of the mobile terminal 600, to collect an audio signal, whereas the third microphone 623c may be disposed in a lower side of the mobile terminal 600, that is, a lower side of the rear case 600-2, to collect an audio signal.

Referring to FIG. 5B, a second camera 695b and a fourth microphone 623d may be further mounted to the rear surface of the rear case 600-2, and the sixth and seventh buttons 630f and 630g and an interface unit 675 may be disposed on a side surface of the rear case 600-2.

The second camera 695b may capture an image or video in a direction substantially opposite to that of the first camera 695a, and have pixels different from those of the first camera 695a. A flash (not shown) and a mirror (not shown) may be further disposed adjacent to the second camera 695b. In addition, another camera may be further installed adjacent to the second camera 695b to capture a three-dimensional image.

A second audio output module (not shown) may be further disposed in the rear case 600-2. The second audio output module may implement a stereo function along with the first audio output module 653a, and may be used to talk in a speakerphone mode.

A power supply 690 may be mounted in the side of the rear case 600-2. The power supply 690 may be, for example, a chargeable battery. The power supply 690 may be detachably coupled to the rear case 600-2 for charging.

The fourth microphone 623d may be disposed on a front surface of the rear case 600-2, that is, a rear surface of the mobile terminal 600, to collect an audio signal.

Figure 6:
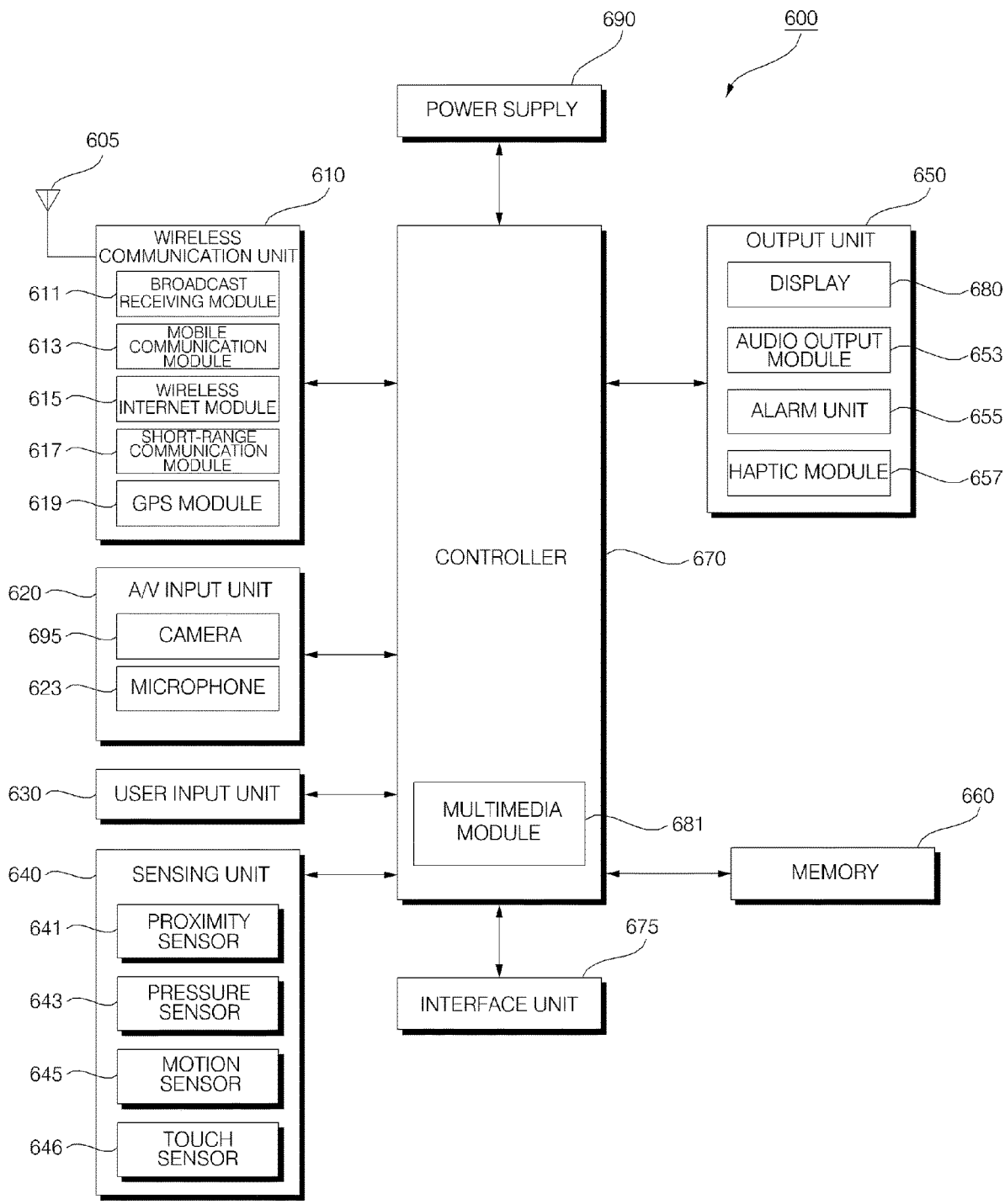
FIG. 6 is a block diagram illustrating the mobile terminal shown in FIG. 5A or 5B.

FIG. 6 is a block diagram illustrating the mobile terminal shown in FIG. 5A or 5B.

Referring to FIG. 6, the mobile terminal 600 may include a wireless communication unit 610, an Audio/Video (A/V) input unit 620, a user input unit 630, a sensing unit 640, an output unit 650, a memory 660, an interface unit 675, a controller 670, and a power supply 690. In the case where the mobile terminal 600 is actually implemented in real, whenever required, two or more components may be combined as a single component, or one component may be segmented to two or more detailed components.

The wireless communication unit 610 may include a broadcast receiving module 611, a mobile communication module 613, a wireless Internet module 615, a short-range communication module 617, a Global Position System (GPS) module 619, and the like.

The broadcast receiving module 611 may receive at least one of a broadcast signal or broadcast-related information from an external broadcast management server through a broadcast channel. The broadcast signal and/or the broadcast-related information received through the broadcast receiving module 611 may be stored in the memory 660.

The mobile communication module 613 may transmit and receive wireless signals with respect to at least one of a base station, an external terminal, or a server on a mobile communication network. In this case, a wireless signal may include a various types of data according to transmission and reception of a voice call signal, a video call signal, or a text/multimedia message.

The wireless Internet module 615 indicates a module for wireless Internet access, and the wireless Internet module 615 may be embedded in the mobile terminal 600 or provided outside the mobile terminal 600.

The short-range communication module 617 indicates a module for short-range communication. Bluetooth, Radio Frequency Identification (RFID), Infrared Data Association (IrDA), Ultra Wideband (UWB), Zigbee, Near Field Communication (NFC), and the like may be used as a short-range communication technology.

The GPS module 619 may receive position information from a plurality of GPS satellites.

The A/V input unit 620 is used to input an audio signal or a video signal. The A/V input unit 620 may include a camera 695, a microphone 623, and the like.

The camera 695 may process a video frame, such as a still image or a video acquired by an image sensor in a video call mode or a capture mode. In addition, a processed video frame may be displayed on the display 680.

A video frame processed by the camera 695 may be stored in the memory 660 or transmitted to the outside through the wireless communication unit 610. The camera 695 may be two or more cameras according to configuration of a terminal.

The microphone 623 may receive an external audio signal by a microphone in a display-off mode, for example, a call mode, a recording mode, and a voice recognition mode, and process the audio signal into electrical voice data.

Meanwhile, the microphone 623 may be a plurality of microphones disposed at different positions. An audio signal received from each microphone may be audio-signal-processed by the controller 670 or the like.

The user input unit 630 may generate data on a key input which is input by a user in order to control operation of the terminal. The user input unit 630 may be in the form of a button, a key pad, a dome switch, a (resistive/capacitive) touch pad, or the like through which is capable of receiving a command or information upon being pressed or touched by a user. In particular, in the case where the touch pad forms an inter-layered structure with the display 680 which will be described later, this may be called a touch screen.

The sensing unit 640 may generate a sensing signal for controlling operation of the mobile terminal 600 by sensing the current state of the mobile terminal 600, such as an opened/closed state of the mobile terminal, a location of the mobile terminal 600, and the presence of a user's contact.

The sensing unit 640 may include a proximity sensor 641, a pressure sensor 643, a motion sensor 645, a touch sensor 646, and the like.

The proximity sensor 641 may detect presence of an object approaching toward the mobile terminal 600 or existing in proximity of the mobile terminal 600, without physically contacting the object. In particular, the proximity sensor 641 may detect an object in proximity using change in an alternating magnetic field or change in a static magnetic field or using a rate of change of electrostatic capacity.

The pressure sensor 643 may detect whether pressure is applied to the mobile terminal 600, and the magnitude of the pressure.

The motion sensor 645 may sense a location or movement of the mobile terminal 600 using an accelerometer, a gyro sensor, or the like.

The touch sensor 646 may sense a touch input by a user's finger of a touch input by a particular pen. For example, in the case where a touch screen panel is positioned on the display 680, the touch screen panel may include a touch sensor 646 for sensing location information and intensity information of a touch input. A sensing signal sensed by the touch sensor 646 may be transferred to the controller 670.

The output unit 650 is configured to output an audio signal, a video signal, or an alarm signal. The output unit 650 may include the display 680, an audio output module 653, an alarm unit 655, a haptic module 657.

The display 680 displays information processed by the mobile terminal 600. For example, when the mobile terminal 600 is in a call mode, the display 680 may display User Interface (UI) or Graphic User Interface (GUI). In addition, when the mobile terminal 600 is in a video call mode or a photographing mode, the display 680 may display photographed or received images separately or simultaneously, and may display UI or GUI.

Meanwhile, as described above, when the display 680 and a touch pad are inter-layered to implement a touch screen, the display 680 may be used not just as an output device, but also as an input device for inputting information by a user's touch.

The audio output module 653 may output audio data received from the wireless communication unit 610 or stored in the memory 160 in a call signal reception mode, a call mode, a record mode, a voice recognition mode, a broadcast reception mode, and the like. In addition, the audio output module 653 may output an audio signal related to a particular function performed by the mobile terminal 600 (e.g., a call signal reception sound, a message reception sound, etc.). The audio output module 653 may include a speaker, a buzzer, and the like.

The alarm unit 655 outputs a signal to inform occurrence of an event of the mobile terminal 600. In addition to an audio signal and a video signal, the alarm unit 655 outputs a signal in a different form to inform occurrence of an event. For example, the alarm unit 655 may output a vibration signal.

The haptic module 657 generates various tactile effects that a user can feel. A typical example of the tactile effects generated by the haptic module 657 is vibration effect. When the haptic module 657 generates vibration as a tactile effect, the strength and pattern of the vibration generated by the haptic module 657 may be converted, and different vibrations may be output in combination or may be output sequentially.

The memory 660 may store programs for processing and controlling operations performed by the controller 670, and may temporarily store input/output data (for example, a phonebook, messages, still images, video, etc.).

The interface unit 675 acts as an interface with every external device connected with the mobile terminal 600. The interface unit 675 may receive data or power from an external device and transfer the received data or power to each component of the mobile terminal 600 or may transmit data stored in the mobile terminal 600 to an external device.

The controller 670 generally controls overall operations of the mobile terminal 600 by controlling each of the aforementioned components. For example, the controller 670 performs control and processing actions associated with voice calls, data communication, video calls, and the like. In addition, the controller 180 may include a multimedia module 681 for reproducing multimedia data. The multimedia module 681 may be configured in a hardware form within the controller 670 or may be configured in a software form separately from the controller 670. Meanwhile, the controller 670 may include an application processor (not shown) to execute an application. Alternatively, the application processor (not shown) may be provided separately from the controller 670.

In addition, the power supply 690 may receive external power and internal power under the control of the controller 670 and supply power required to operate each component.

Figure 7:
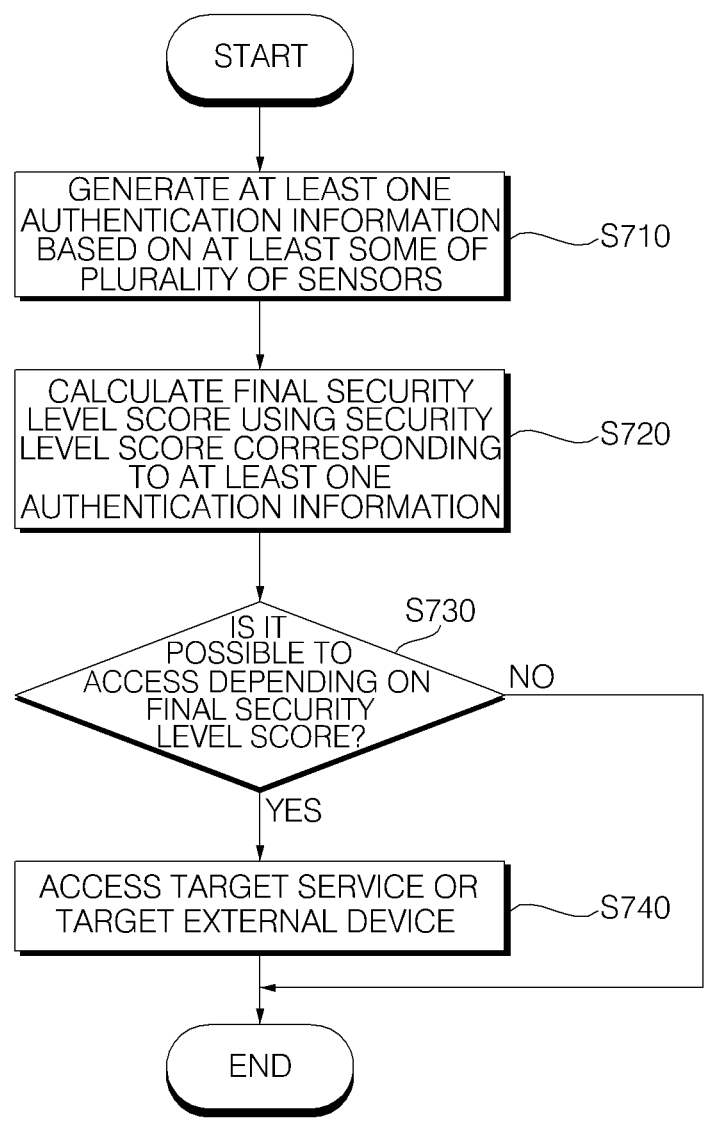
FIG. 7 is a flowchart illustrating an operation method of an electronic device according to an embodiment of the present invention.

FIG. 7 is a flowchart illustrating an operation method of an electronic device according to an embodiment of the present invention, and FIGS. 8 to 17D are diagrams for explaining the operation method shown in FIG. 7.

Referring to FIG. 7, the controller 170 of the electronic device 100 receives an activation signal in S703.

For example, the event manager 305 shown in FIG. 3 may receive an activation signal.

The activation signal may include at least one of an input signal from the input unit 130, a sensing signal from a touch sensor 146 or the inertial sensor 145 among a plurality of sensors, or a voice signal from the microphone 123 among a plurality of sensors.

Meanwhile, the activation signal may include an input signal for executing a first service. For example, the first service may be a web login service, a payment service, a external device remote control service, etc.

Next, the controller 170 of the external device 100 may perform control such that some of a plurality of sensors are activated based on the received activation signal in S705.

For example, the event manager 305 shown in FIG. 3 may output a trigger signal Tri for activating some of a plurality of sensors to the sensing unit 140 based on a received activation signal.

Meanwhile, the event manager 305 shown in FIG. 3 may output a trigger signal Tri for activating the access determiner 340 to the access determiner 340 based on a received activation signal.

Based on the trigger signal Tri, some of the plurality of sensors may be activated. In this manner, some of the plurality of sensors are activated when necessary, thereby reducing unnecessary power consumption. That is, power may be managed efficiently.

Next, the controller 170 of the electronic device 100 generates at least one authentication information based on at least one of the activated sensors in S710.

In particular, the authentication information generator 310 in the controller 170 may generate at least one authentication information based on a sensor which is activated among a plurality of sensors in the sensing unit 140.

For example, the authentication information generator 310 may generate iris authentication information or face authentication information based on an image received from the camera 195.

Meanwhile, the authentication information generator 310 may generate fingerprint authentication information based on an image acquired by the fingerprint sensor 142.

Meanwhile, the authentication information generator 310 may generate glottal authentication information or voice authentication information based on a user's voice received through the microphone 123.

Meanwhile, the authentication information generator 310 may generate use pattern authentication information based on a sensing signal from a touch sensor 146.

Meanwhile, the authentication information generator 310 may generate location authentication information based on a sensing signal from the inertial sensor 145 or a GPS sensor (not shown).

Meanwhile, the authentication information generator 310 may generate illumination authentication information based on a sensing signal from the illumination sensor 148.

Next, the controller 170 of the electronic device 100 may calculate a security level score corresponding to at least one authentication information generated by the authentication information generator 310, and calculate a final security level score based on the calculated security level score in S720.

The security level score calculator 320 in the controller 170 may calculate a security level score for each authentication information generated by the authentication information generator 310.

The security level score calculator 320 may calculate a security level score for each authentication information generated by the authentication information generator 310.

Meanwhile, a security level score for each authentication information generated by the authentication information generator 310 may be pre-stored in the memory 160.

Meanwhile, in an embodiment of the present invention, a security level score may be set differently depending on a type of authentication information.

Meanwhile, the security level score calculator 320 may perform control such that a security level score for authentication information is changed based on time lapse or occurrence of an event.

Meanwhile, after generating authentication information, the security level score calculator 320 may reduce a security level score for the authentication information over time.

In particular, after receiving authentication information, the security level score calculator 320 may reduce a security level score for the authentication information after a predetermined time or sequentially over time.

In one example, the security level score calculator 320 may first set a security level score for iris authentication information to level 9, and reduce to level 7 after 5 minutes and then to level 5 after 10 minutes.

In another example, the security level score calculator 320 may first set a security level score for fingerprint authentication information to Level 5, and reduce to Level 4 after 5 minutes and to Level 3 after 10 minutes.

As such, depending on a type of authentication information, a security level score for the authentication information may be reduced by a different degree over time.

A final level score calculator 330 in the controller 170 may calculate a final security level score based on authentication information received from the security level score calculator 320.

In one example, the final security level score calculator 330 may calculate a final security level score by summing a plurality of authentication information received from the security level score calculator 320.

In another example, the final security level score calculator 330 may calculate a final security level score by assigning different weights to a plurality of authentication information received from the security level score calculator 320.

Meanwhile, the final security level score 330 may perform control such that a final security level score is changed based on time lapse or occurrence of an event.

Meanwhile, after calculating a final security level score, the final security level score calculator 330 may reduce the final security level score over time.

In particular, after calculating a final security level score, the final security level score calculator 330 may reduce the final security level score after a predetermined time or sequentially over time.

Next, based on the final security level score, the controller 170 of the electronic device 100 may determine whether a particular service or a particular external device is accessible in S730. When the particular service or the particular external device is accessible, the controller 170 may perform an access to the particular service or the particular external device in S740.

Based on the final security level score calculated by the final security level score calculator 330, the access determiner 340 may determine whether the target service or the target external device is accessible.

For example, the access determiner 340 may receive security level information required by a web login service or a payment service, and compare a calculated final security level score with a received security level score required by the web login service or the payment service. When the calculated final security level score is greater than the required security level score, the access determiner 340 may determine that the web login service or the payment service is accessible.

When it is determined that a target service or a target external device is accessible, the access determiner 340 may transmit a data transmission request to the server 300. In response to the data transmission request, the server 300 may transmit data to the electronic device 100.

Accordingly, the electronic device 100 may display a screen related to a corresponding service based on the received data.

Accordingly, it is possible to easily access a target service or a target external device through multi-factor authentication.

Meanwhile, when the calculated final security level score is smaller than the security level score required for the web login service or the payment service, the access determiner 340 may determine that additional authentication is necessary for the web login service or the payment service and may transmit information about a request for additional authentication to the event manager 305 or the sensing unit 140.

Accordingly, an inactive sensor in the sensing unit 140 may be activated.

Meanwhile, for convenience of explanation, description will be hereinafter given focusing on a mobile terminal 600 which is an example of an electronic device.

Figure 8:
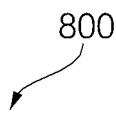
FIGS. 8 to 17D are diagrams for explaining the operation method shown in FIG. 7.

FIG. 8 shows a security level score for each authentication information stored in a memory 660 of the mobile terminal 600.

Referring to the drawing, a lookup table 800 of security level scores may be stored in the memory 660 of the mobile terminal 600.

The lookup table 800 of security level scores includes security level scores for iris authentication information, fingerprint authentication information, face authentication information, voice recognition information, use pattern authentication information, and location authentication information. However, it is merely exemplary and may include diverse authentication information.

In the drawing, a security level score for iris authentication information is set to Level 9, a security level score for fingerprint authentication information is set to Level 5, a security level score for face authentication information is set to Level 3, a security level score for voice authentication information is set to Level 2, a security level score for use pattern authentication information is set to Level 1, and a security level score for location authentication information is set to Level 0.5.

As such, in an embodiment of the present invention, a security level score may be set differently depending on a type of authentication information.

Meanwhile, in the drawing, security level scores for iris authentication information, fingerprint authentication information, face authentication information, voice authentication information, use pattern authentication information, and location authentication information are all different. However, it is merely exemplary and at least some of the security level scores may be set differently.

FIG. 9 shows an example in which a user picks up a mobile terminal 600 staying in a standby mode or a locked mode.

When motion information received from a motion sensor 645 remaining activated even in the standby mode or the locked mode is equal to or greater than a reference value, the controller 670 of the mobile terminal 600 may generate and output an activation signal.

Accordingly, the event manager 305 in the controller 670 may output a trigger signal to the camera 695 based on a received activation signal.

In conclusion, the controller 670 of the mobile terminal 600 may perform control such that a camera 695 is activated to release the standby mode or the locked mode.

Accordingly, the camera 695 of the mobile terminal 600, especially, a front camera 695*a*, may capture an image of a user's face.

Figure 9A:
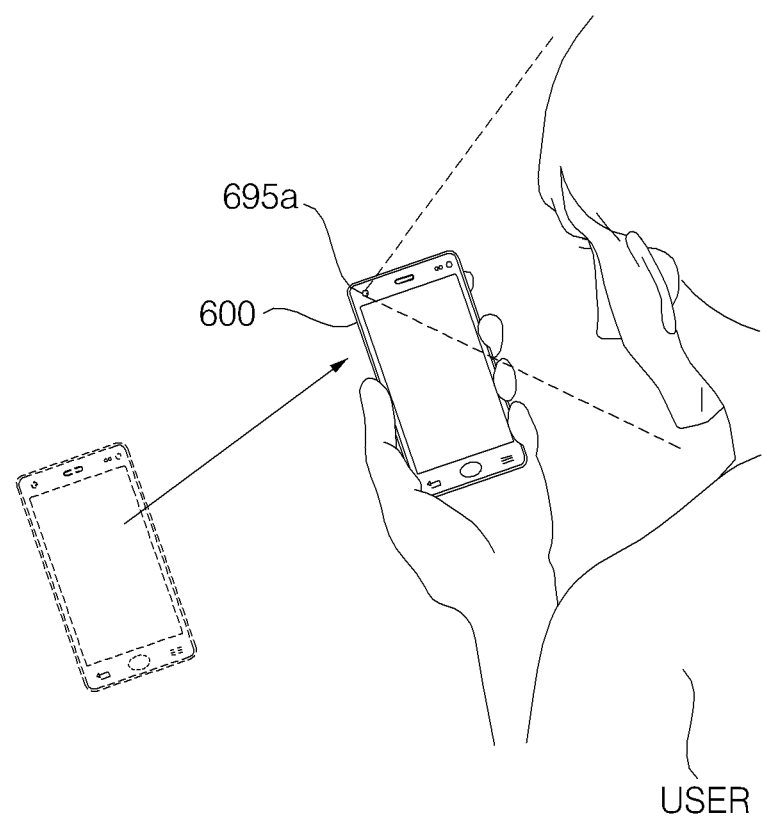
Figure 9B:
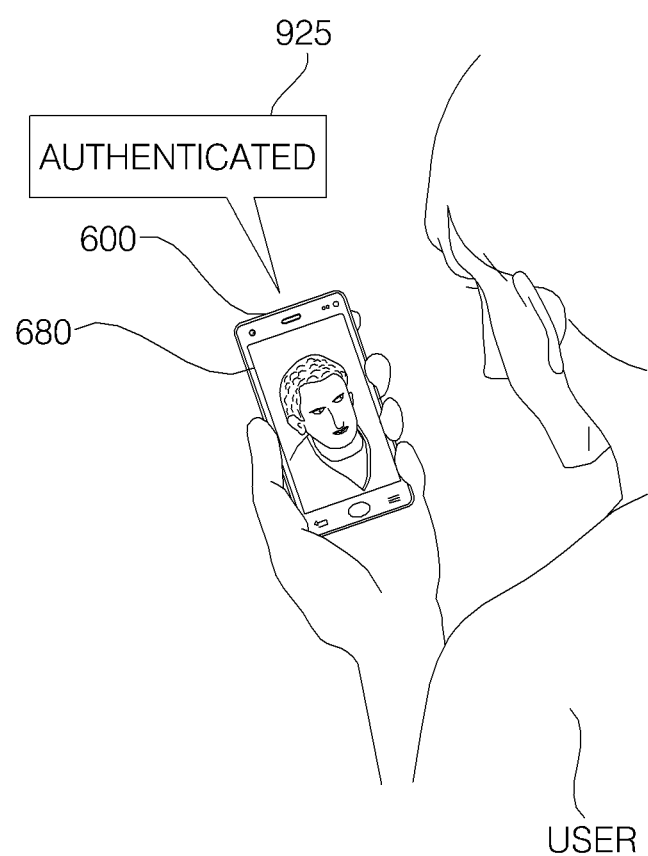

FIG. 9B shows an example in which an image captured by the camera 695 is displayed on the display 680.

Meanwhile, the controller 670 of the mobile terminal 600 generates face authentication information based on the image captured by the camera 695, and acquires a security level score for face authentication information stored in the memory 660.

As illustrated in FIG. 8, when face authentication information is Level 3 (LV3), the controller 670 of the mobile terminal 600 acquires a security level score of Level 3 (LV3).

Meanwhile, when there is no authentication information except face authentication information, the controller 670 of the mobile terminal 600 may confirm a security level score for the face authentication information as a final security level score.

Meanwhile, when a security level score necessary for the standby mode or the locked mode is Level 3, the controller 670 of the mobile terminal 600 may compare the required security level score with a final security level score being based on face authentication information, and may determine that a service is executable.

Figure 9C:
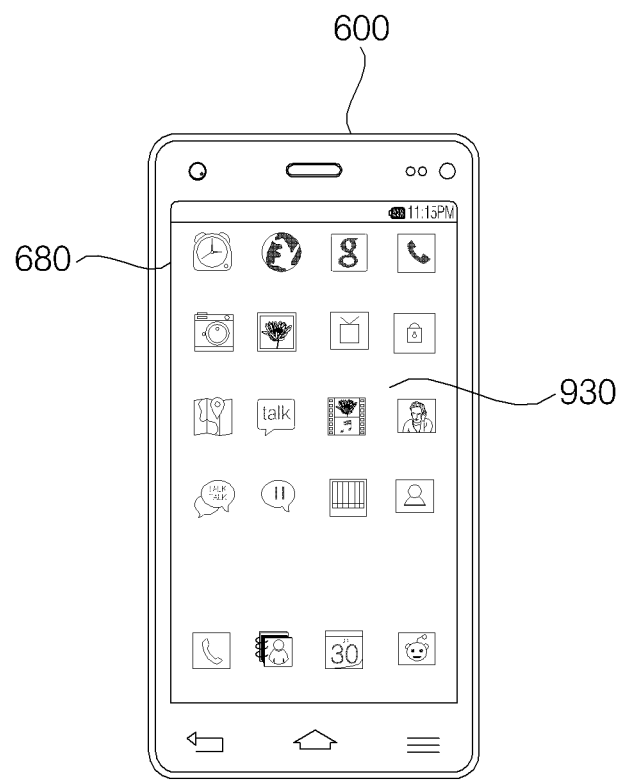

Accordingly, the controller 670 of the mobile terminal 600 may perform control such that an authentication completion message 925 is output in a sound or image form, as shown in FIG. 9B, and the controller 670 of the mobile terminal 600 may perform control such that a home screen 930 is displayed, as shown in FIG. 9C.

Referring to FIGS. 9A, 9B, and 9C, a user just picks up the mobile phone 600 and the mobile terminal 600 may automatically activate a sensor and perform a process of releasing a locked mode. Thus, it is possible to provide a convenient lock release function for the user.

Figure 10A:
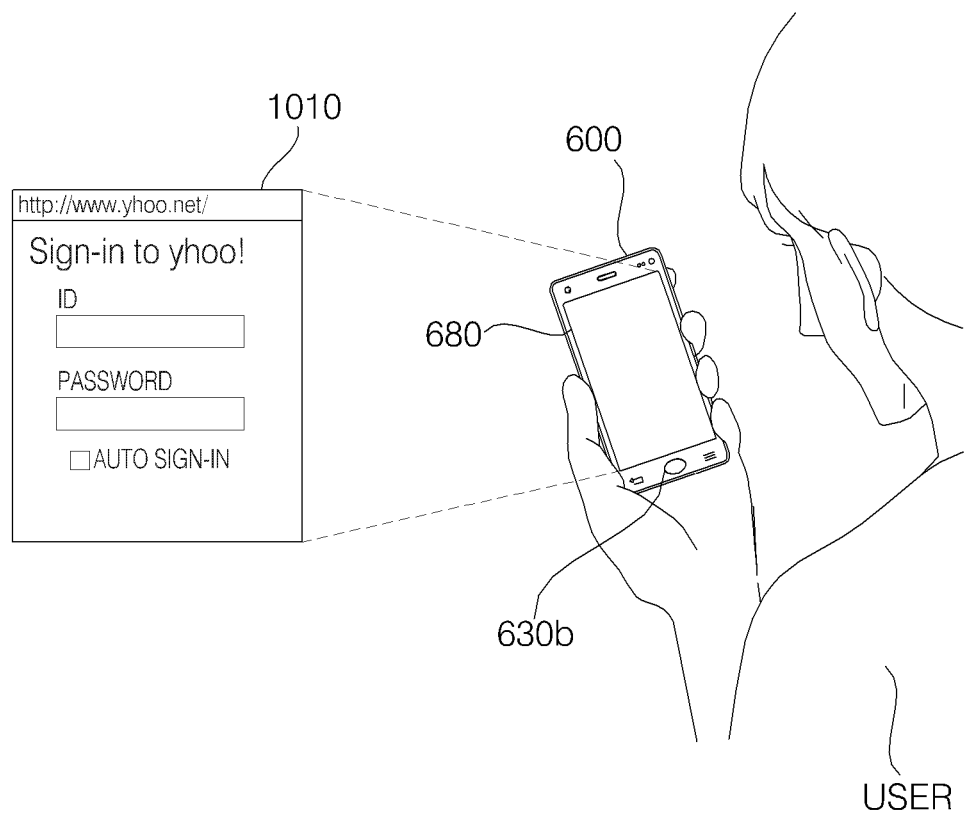
Figure 10B:
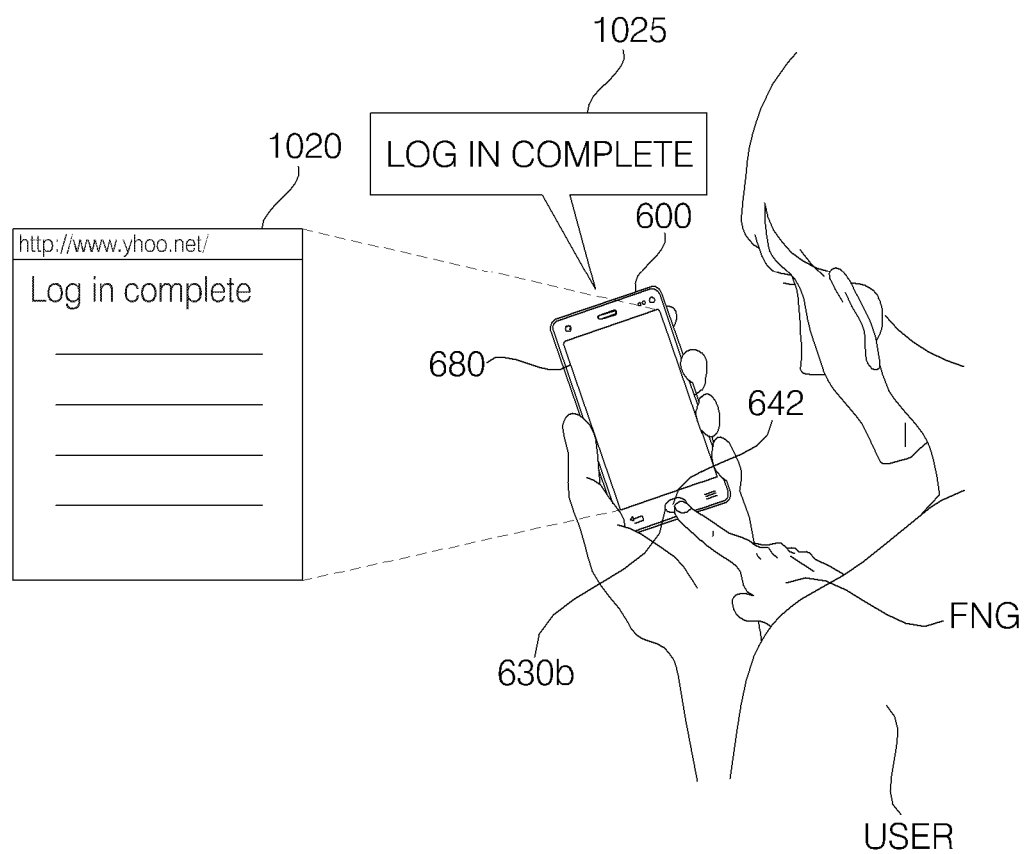

FIGS. 10A and 10B are diagrams for explaining a web login service.

The controller 670 of the mobile terminal 600 may perform control such that a web browser is executed upon a user's touch input.

Accordingly, a web screen as in FIG. 10A is displayed, and especially a login screen 1010 may be displayed.

When the login screen 1010 is displayed, the controller 670 of the mobile terminal 600 may determine that an event has occurred, and may perform control such that a fingerprint sensor in the sensing unit 640 is activated.

Accordingly, as shown in FIG. 10B, a fingerprint sensor 642 disposed on a third button 630b may be activated.

In addition, when a user's finger FNG is placed on the fingerprint sensor 646 disposed on the button 630b, the fingerprint sensor 642 may capture a fingerprint image.

The controller 670 of the mobile terminal 600 generates fingerprint authentication information based on the fingerprint image captured by the fingerprint sensor 642, and acquires a security level score for fingerprint authentication information stored in the memory 660.

As shown in FIG. 8, when the fingerprint authentication information is Level 5 (LV5), the controller 670 of the mobile terminal 600 acquire a security level score of Level 5 (LV5).

Meanwhile, based on face recognition information according to FIG. 9B and fingerprint recognition information according to FIG. 10B, the controller 670 of the mobile terminal 600 may calculate a final security level score into Level 8 (LV8) which is a sum of Level 3 (LV3) and Level 5 (LV5).

Meanwhile, when a security level score necessary for a web login service is Level 5, the controller 670 of the mobile terminal 600 may determine that the service is executable, because the final security level score is Level 8.

Accordingly, the controller 670 of the mobile terminal 600 may provide login authentication information to a web server which provides a web service, and may receive data necessary for the web service from the web server.

In addition, the controller 670 of the mobile terminal 600 may perform control such that a screen 1020 logged into the web service is displayed and a login completion message 1025 is output in a sound or image form.

Referring to FIGS. 10A and 10B, when a web login screen is displayed, a user just takes an action for fingerprint recognition and the mobile terminal 600 may automatically activate a sensor and perform a login process. Thus, it is possible to provide a convenient web login service for the user.

Figure 11A:
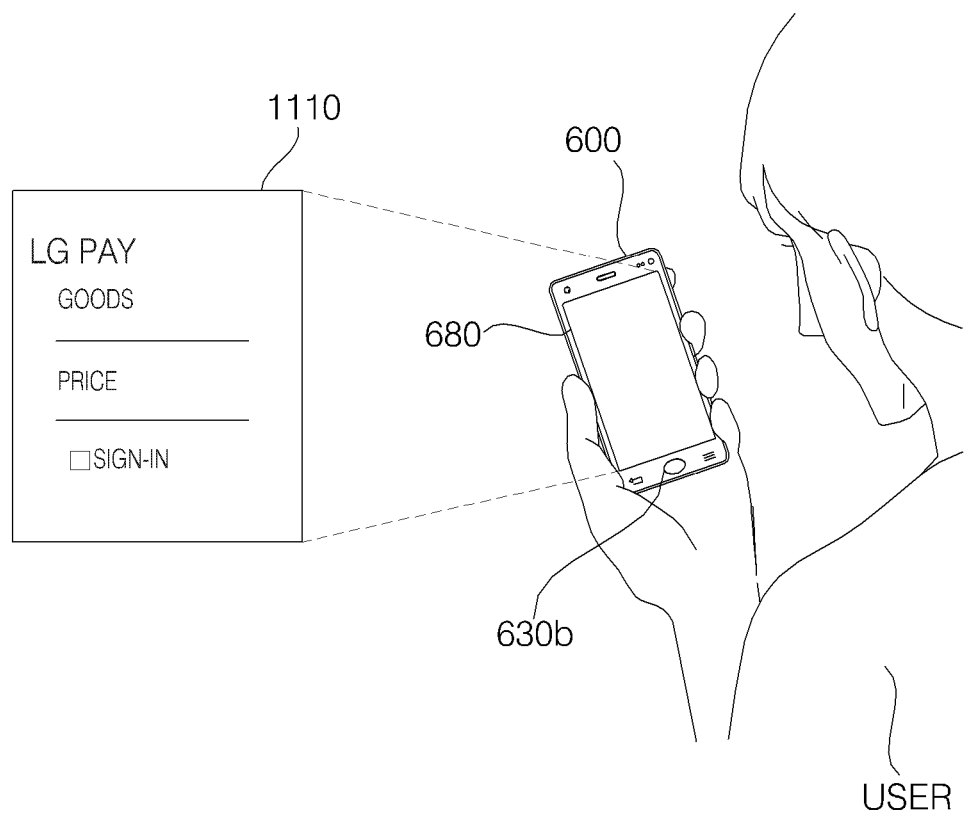
Figure 11B:
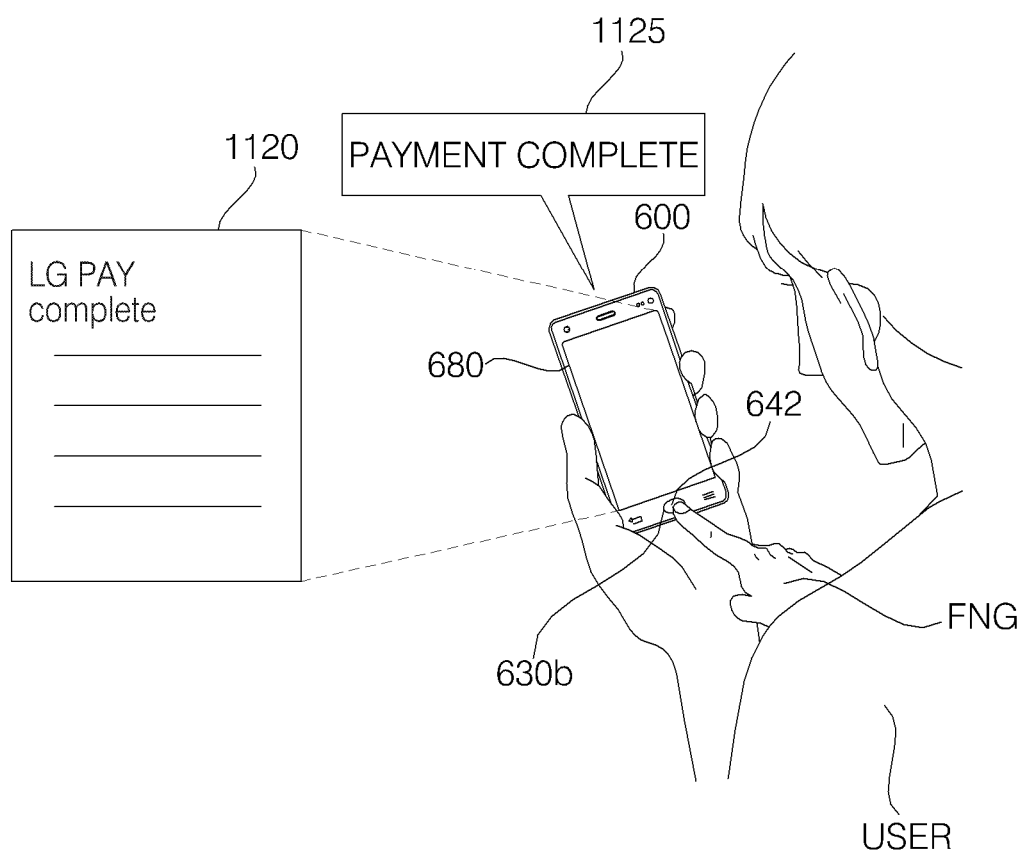

FIGS. 11A and 11B are diagrams for explaining online payment.

The controller 670 of the mobile terminal 600 may perform control such that a payment service is executed upon a user's touch input. Accordingly, a payment screen 1110 as in FIG. 11A may be displayed.

When the payment screen 1110 is displayed, the controller 670 of the mobile terminal 600 may determine that an event has occurred, and may perform control such that a fingerprint sensor in the sensing unit 640 is activated.

Accordingly, the fingerprint sensor 642 disposed on the third button 630b as in FIG. 11B may be activated.

In addition, when a user's finger FNG is placed on the fingerprint sensor 642 disposed on the button 630b, the fingerprint sensor 642 may capture a fingerprint image.

In addition, the controller 670 of the mobile terminal 600 generates fingerprint authentication information based on the fingerprint image captured by the fingerprint sensor 642, and acquires a security level score for fingerprint authentication information stored in the memory 660.

As shown in FIG. 8, when fingerprint authentication information is Level 5 (LV5), the controller 670 of the mobile terminal 600 acquires a security level score of Level 5 (LV5).

Meanwhile, when a security level score necessary for a payment service is Level 9, the controller 670 of the mobile terminal 600 may determine that the service is not executable, because the final security level score is Level 6. In this case, the controller 670 may perform control such that an additional authentication message is output or an inactive sensor is activated.

For example, the controller 670 of the mobile terminal 600 may activate the camera 695.

Accordingly, the controller 670 of the mobile terminal 600 may acquire an image from the camera 695, especially the front camera 695a, and acquire authentication information based on the image.

Meanwhile, the current final security level score is Level 5, and thus, although face authentication information of Level 3 is acquired, it is not possible to reach 9 which is the security level score for the payment service.

Accordingly, the controller 670 of the mobile terminal 600 may perform control such that iris authentication information, other than face authentication information, is generated based on an image acquired from the front camera 695a.

When the controller 670 of the mobile terminal 600 generates iris authentication information, a security level score for the iris authentication information is Level 9 (LV9). Thus, the controller 670 of the mobile terminal 600 may calculate a final security level score into Level 14 (LV14) which is a sum of Level 5 (LV5) and Level 9 (LV9).

Accordingly, because the final security level score is Level 14, the controller 670 of the mobile terminal 600 may determine that the service is executable.

Accordingly, the controller 670 of the mobile terminal 600 may provide available authentication information to a payment server which provides the payment service, and may receive data necessary for the payment service from the payment server.

In addition, the controller 670 of the mobile terminal 600 may perform control such that a payment process is completed, a payment completion screen 1120 indicating completion of the payment service is displayed as in FIG. 11B, and a payment completion message 1125 is output in a sound or image form.

Referring to FIGS. 11A and 11B, a user just takes an action for fingerprint recognition to make a payment, and the mobile terminal 600 may automatically activate a sensor and perform a payment process. Thus, it is possible to provide a convenient payment service for a user.

Figure 12A:
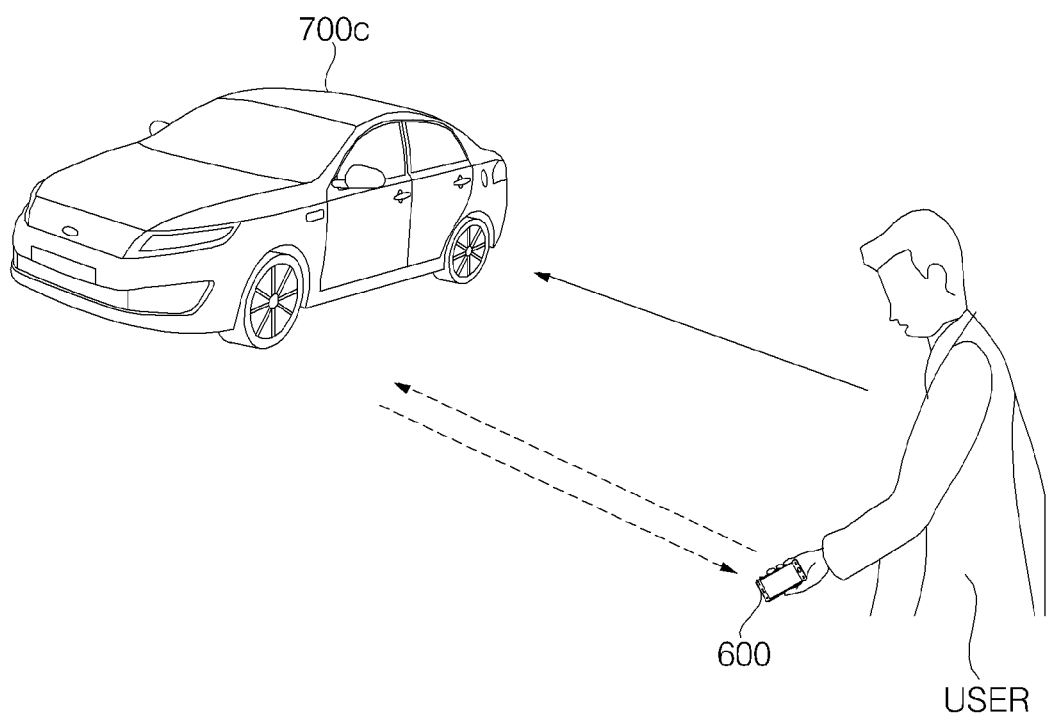
Figure 12B:
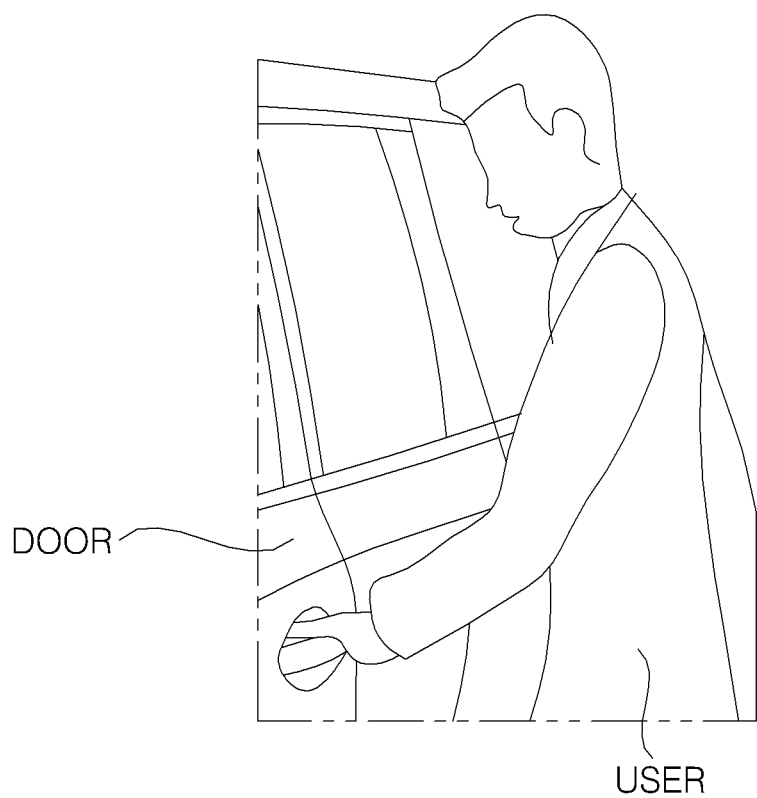

FIGS. 12A and 12B are diagrams for explaining acquisition of a use right for vehicle.

FIG. 12A shows an example in which a user holding the mobile terminal 600 approaches a vehicle 700c.

In the case where the vehicle 700c periodically transmits a beacon signal, if the strength of a received beacon signal, the mobile terminal 600 may determine that a distance to the vehicle 700c is equal to or shorter than a specific distance, and may transmit a response signal to the vehicle 700c.

Accordingly, the vehicle 700c and the mobile terminal 600 may be wirelessly paired.

Meanwhile, after being wirelessly paired, the controller 670 of the mobile terminal 600 may activate some sensors in the sensing unit. For example, the controller 670 of the mobile terminal 600 may activate the fingerprint sensor 642.

As shown in FIG. 10B or 11B, when a user's finger FNG is placed on the fingerprint sensor 642 disposed on the button 630b, the fingerprint sensor 642 may capture a fingerprint image.

In addition, the controller 670 of the mobile terminal 600 generates fingerprint authentication information based on the fingerprint image captured by the fingerprint sensor 642, and acquires a security level score for fingerprint recognition authentication information stored in the memory 660.

As shown in FIG. 8, when the fingerprint authentication information is Level 5 (LV5), the controller 670 of the mobile terminal 600 acquires a security level score of Level 5 (LV5).

Meanwhile, when a security level score required for a vehicle control right acquiring service is Level 4, the controller 670 of the mobile terminal 600 may determine that the service is executable, because a final security level score is Level 5.

Accordingly, the controller 670 of the mobile terminal 600 may perform control such that vehicle control right acquisition information is transmitted to the vehicle 700c.

Thus, as shown in FIG. 12B, if a user holds and pulls a door handle, the door lock may be released and the door may be opened.

Meanwhile, as shown in the drawings, a security level score required for a vehicle start-up right service, which is necessary for a user inside the vehicle 700c to acquire the right to start up a vehicle, may be equal to or greater than Level 9.

Accordingly, the controller 670 of the mobile terminal 600 may activate a microphone and the front camera 695a so that a security level score for user voice authentication information and a security level score for face authentication information are further acquired.

Accordingly, since fingerprint authentication information is Level 5 (LV5), voice authentication information is Level 2 (LV2), and face authentication information is Level 3 (LV3), a final security level score may be Level 10 and therefore a vehicle ignition right may be acquired. Thus, it is possible to turn on an ignition system of the vehicle.

According to FIGS. 12A and 12B, a user just takes an action for fingerprint recognition to acquire a vehicle access right, and the mobile terminal 600 may automatically activate a sensor and acquire a vehicle access right. Thus, it is possible to provide a vehicle access right acquisition service convenient for the user.

Meanwhile, in response to occurrence of an event, the controller 670 may generate authentication information based on a sensing signal from a pre-activated sensor. In this case, the controller 670 may perform control such that a security level score for authentication information is changed in response to occurrence of an event.

Figure 13A:
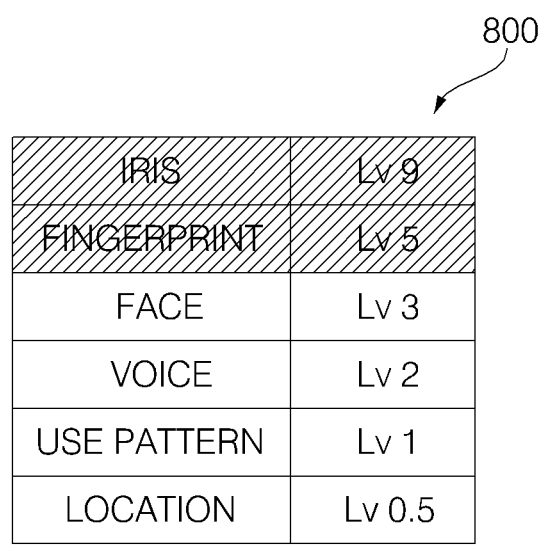

FIG. 13A shows an example of acquiring iris authentication information and fingerprint authentication information from among a plurality of authentication information in the lookup table 800.

That is, when the camera 695 and the fingerprint sensor 642 of the mobile terminal 600 are activated, the controller 670 may acquire iris authentication information and fingerprint authentication information based on an image acquired by the camera 695 and a fingerprint image acquired by the fingerprint sensor 642. Accordingly, a final security level score may be Level 14 which is a sum of Level 9 and Level 5.

FIG. 13B shows an example in which face authentication information, use pattern authentication information, and location authentication information are acquired from among a plurality of authentication information in the lookup table 800.

That is, when the camera 695, the touch sensor 646, and the GPS module 619 of the mobile terminal 600 are activated, the controller 670 may acquire face authentication information, use pattern authentication information, and location authentication information based on an image acquired by the camera 695. Accordingly, a final security level score may be Level 4.5 which is a sum of Level 3, Level 2, and Level 0.5.

Figure 13C:
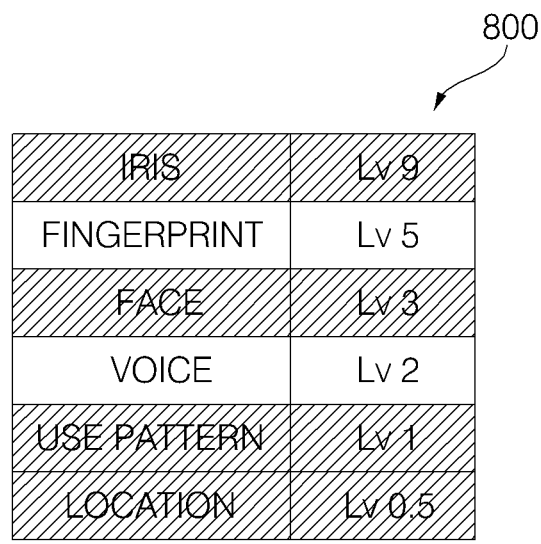

FIG. 13C shows an example in which iris authentication information, face authentication information, use pattern authentication information, and location authentication information are acquired from among a plurality of authentication information in the lookup table 800.

That is, when the camera 695, the touch sensor 646, and the GPS module 619 of the mobile terminal 600 are activated, the controller 670 may acquire iris authentication information and face authentication information based on an image acquired by the camera 695, use pattern information based on a user's touch pattern sensed by the touch sensor 646, and location authentication information based on the GPS module 619. Accordingly, a final security level score may be Level 13.5 which is a sum of Level 9, Level 3, Level 1, and Level 0.5.

Figure 13D:
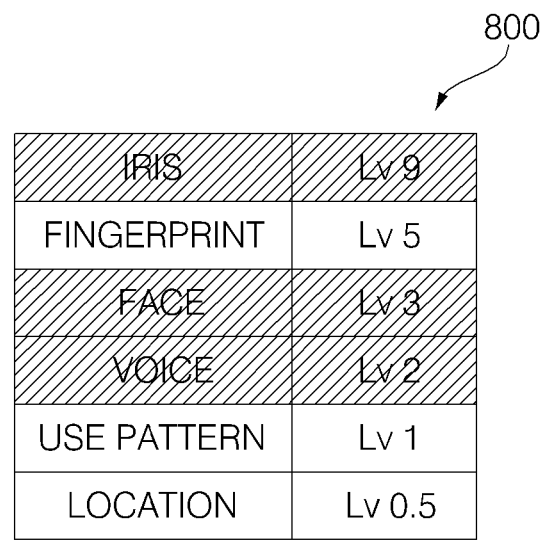

FIG. 13D shows an example in which iris authentication information, face authentication information, and voice authentication information are acquired among a plurality of authentication information in the lookup table 800.

That is, when the camera 695 and the microphone 623 of the mobile terminal 600 are activated, the controller 670 may acquire iris authentication information and face authentication information based on an image acquired by the camera 695, and voice authentication information based on sound acquired by the microphone 623. Accordingly, a final security level score may be Level 14 which is a sum of Level 9, Level 3, and Level 2.

Meanwhile, the controller 170 may perform control such that a security level score for authentication information is changed over time. Description thereof will be provided with reference to FIG. 14A.

Figure 14A:
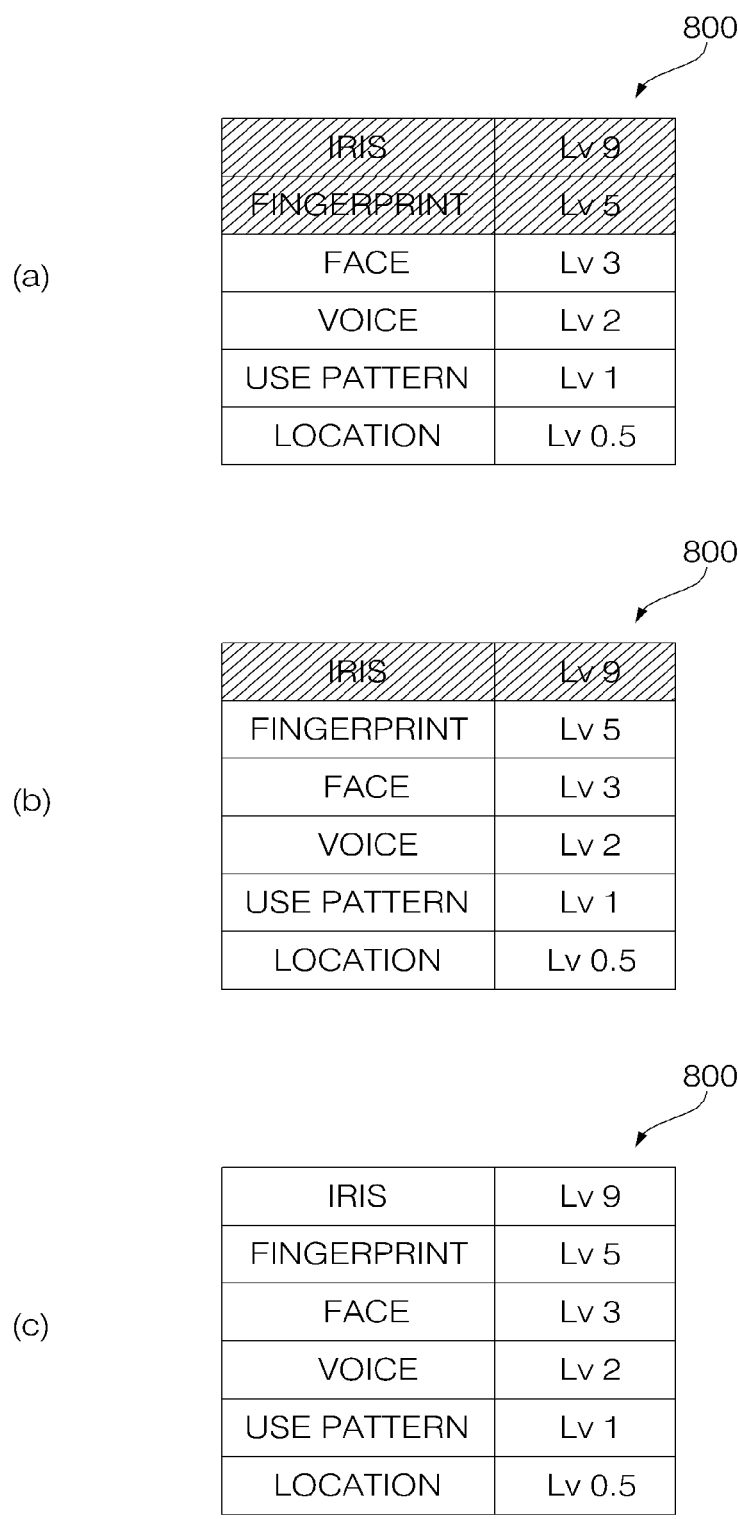
Figure 14A:
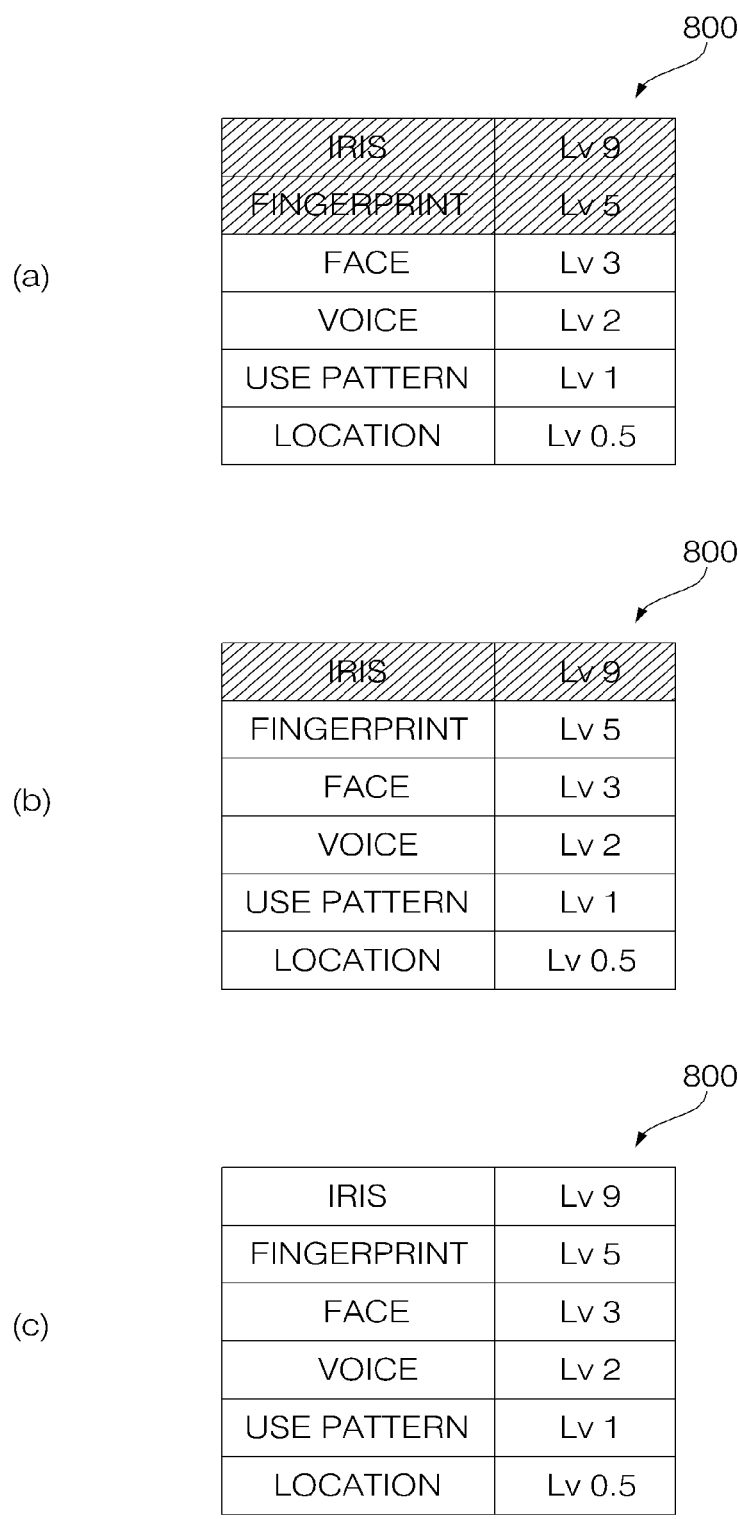
Figure 14A:
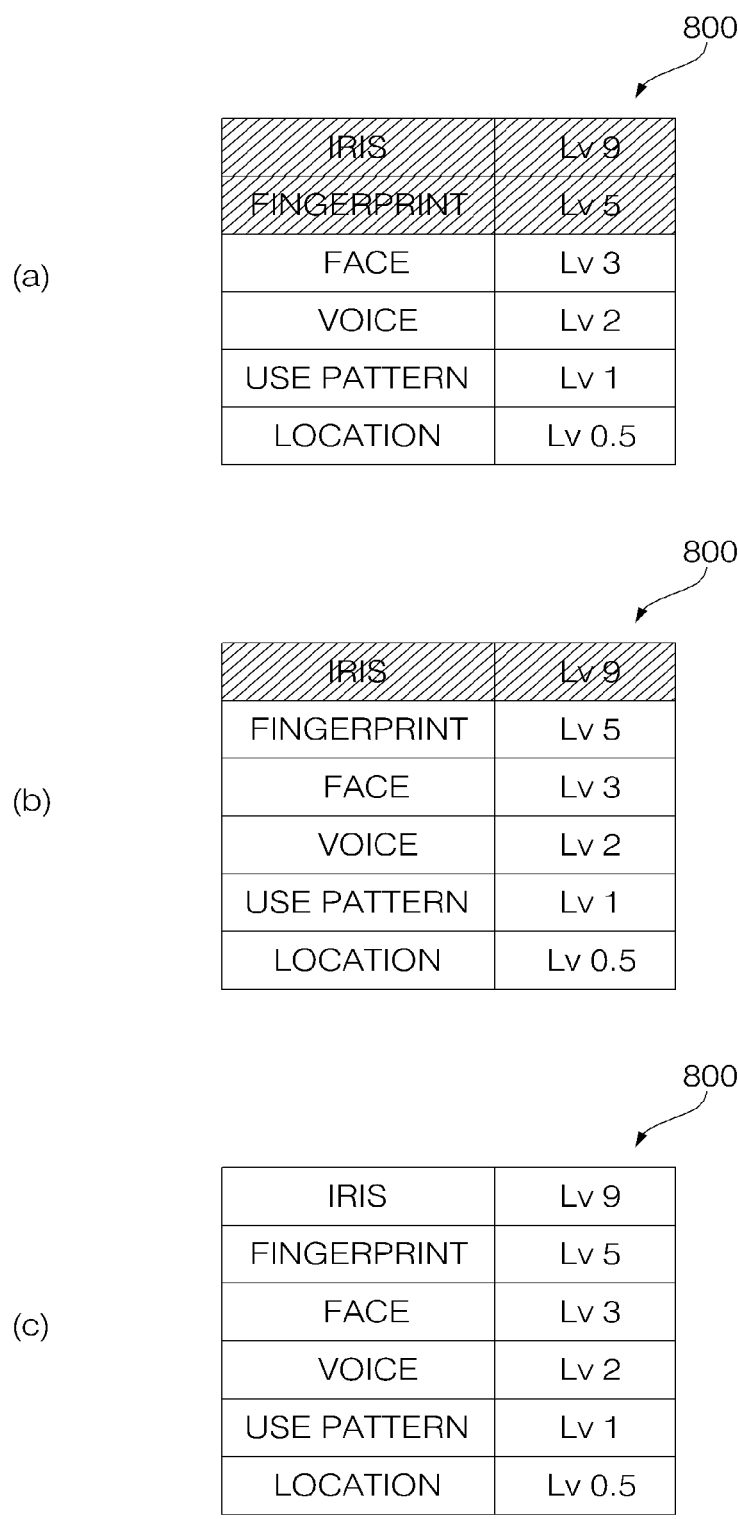

FIG. 14A shows an example of security level scores for a plurality of authentication information in the lookup table 800.

First, iris authentication information and fingerprint authentication information may be acquired at a first point in time, as in (a) of FIG. 14A. Thus, a final security level score may be Level 14 which is a sum of Level 9 and Level 5.

Meanwhile, the fingerprint authentication information may disappear at a second point in time, as shown in (b) of FIG. 14A. For example, after 15 minutes since fingerprint authentication, the fingerprint authentication may be determined invalid for a security reason and may be deactivated.

Therefore, the final security level score may be Level 9.

Meanwhile, the iris authentication information may disappear at a third point in time, as in (c) of FIG. 14A. For example, when 10 minutes have elapsed after iris authentication, the iris authentication may be determined invalid for a security reason and may be deactivated.

Therefore, the final security level score may be Level 0.

Meanwhile, in response to occurrence of an event, the controller 170 may perform control such that authentication information and a final security level score are changed. Description thereof will be provided with reference to FIG. 14B.

Figure 14B:
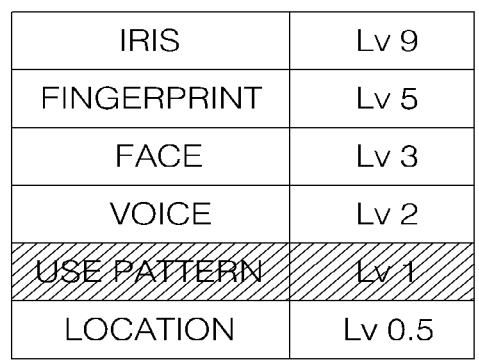
Figure 14B:
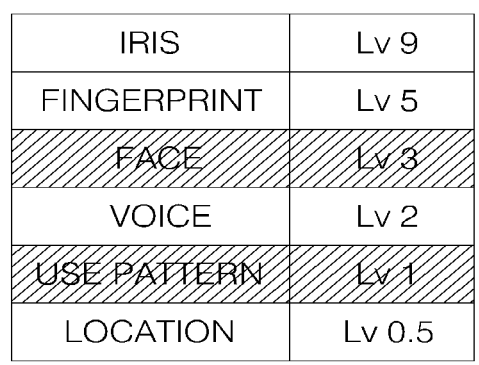
Figure 14B:
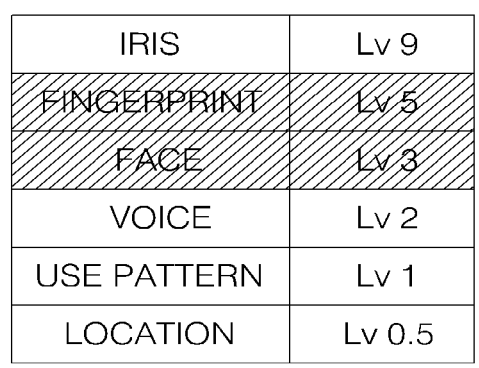

FIG. 14B shows an example of security level scores for a plurality of authentication information in the lookup table 800.

First, user pattern authentication information may be acquired at a first point in time, as in (a) of FIG. 14B. Therefore, a final security level score may be Level 1.

Meanwhile, face authentication information may be added at a second point in time, as in (b) of FIG. 14B. therefore, the final security level score may be Level 4 which is a sum of Level 1 corresponding to the use pattern authentication information and Level 3 corresponding to the face authentication information.

Meanwhile, the use pattern authentication information may disappear and instead fingerprint authentication information may be added at a third point in time, as in (c) of FIG. 14B.

For example, when 30 minutes have elapsed after acquisition of use pattern authentication information, the use pattern authentication information may be determined invalid and may be deactivated.

In addition, when the finger authentication information is added, a final security level score may be Level 8 which is a sum of Level 5 corresponding to the fingerprint authentication information and Level 3 corresponding to the face authentication information.

Figure 15A:
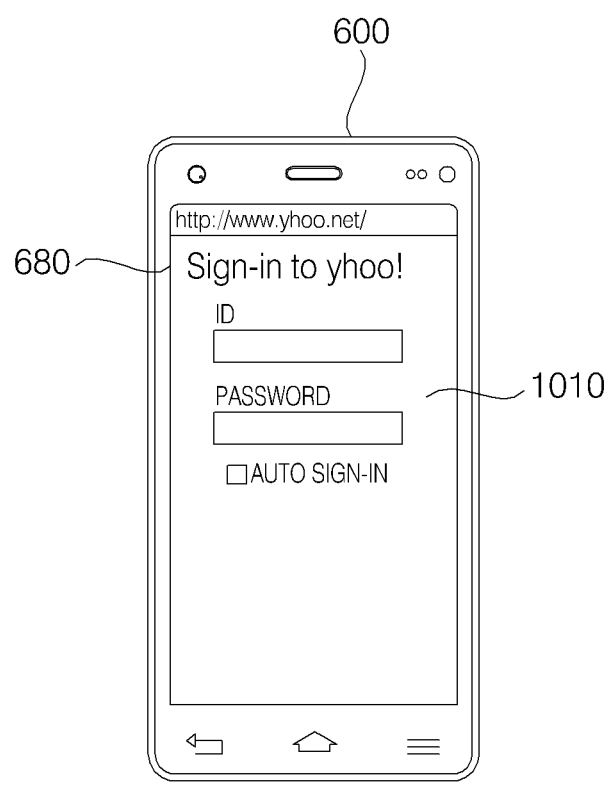

FIG. 15A shows an example in which a web login screen 1010 is displayed in the mobile terminal 600.

FIG. 15A shows an example in which a final security level score of the mobile terminal 600 is Level 3 and a security level score necessary for a web login service is Level 5.

Accordingly, the controller 670 of the mobile terminal 600 may perform control such that the current final security level score is displayed and a message 1515 notifying activation of some sensors is output.

The drawing shows an example in which a fingerprint sensor is activated among a plurality of sensors.

Meanwhile, when a calculated final security level score is smaller than a first security level score required by a target service or a target external device, the controller 670 of the mobile terminal 600 may activate a first sensor remaining inactive among a plurality of sensors. Based on the activated first sensor, the controller 670 of the mobile terminal 600 may generate additional authentication information. Further based on the additional authentication information, the controller 670 of the mobile terminal 600 calculate a second final security level score. Based on the calculated second final security level score, the controller 670 may determine whether the target service or the target external device is accessible.

Figure 15B:
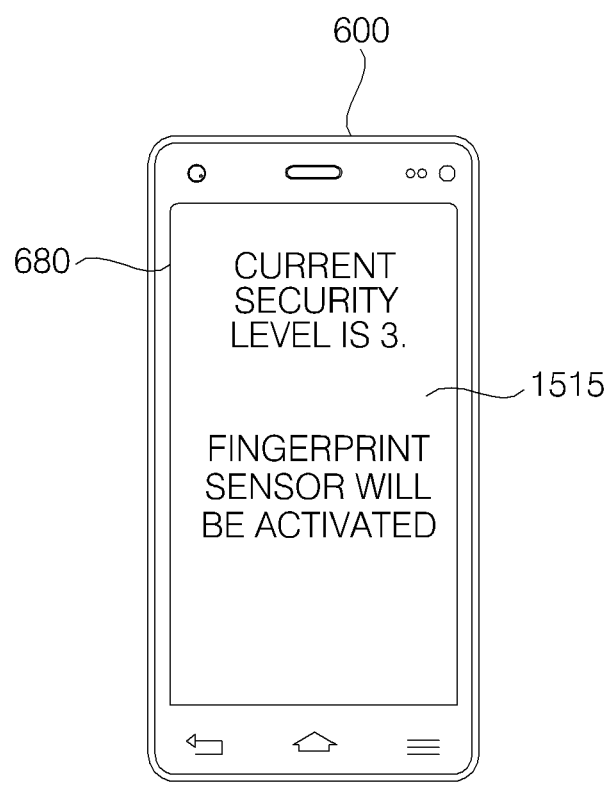

Referring to FIG. 15B, since fingerprint authentication information corresponds to Level 5, a final security level score may become Level 8 when the fingerprint authentication information is acquired. The web login process may be performed accordingly. In particular, the web login process may be performed even without an ID and a password.

As such, as a plurality of biometric authentication information is used, a user does not need to remember an ID and a password, and therefore, authentication may be performed easily while maintaining a high security level.

Figure 15C:
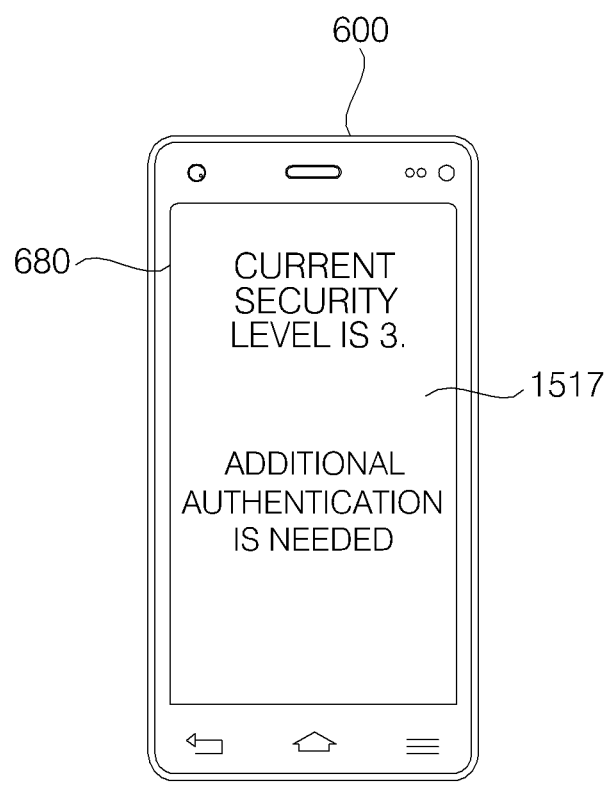

Meanwhile, as shown in FIG. 15C, when a calculated final security level score is smaller than a first security level score required by a target service or a target external device, the controller 670 of the mobile terminal 600 may output a message 1517 for requesting additional authentication information.

When the calculated final security level score is smaller than the first security level score required by the target service or the target external device, the controller 670 of the mobile terminal 600 may output indicator items to guide selection of a plurality of authentication information. When one of the indicator items is selected, the controller 670 may activate a sensor or authentication information corresponding to the selected indicator item. Based on the activated sensor or the activated authentication information, the controller 670 may generate additional authentication information. Further based on the additional authentication information, the controller 670 may calculate a second final security level score. Based on the second final security level score, the controller 670 may determine whether a target service or a target external device is accessible.

Figure 15D:
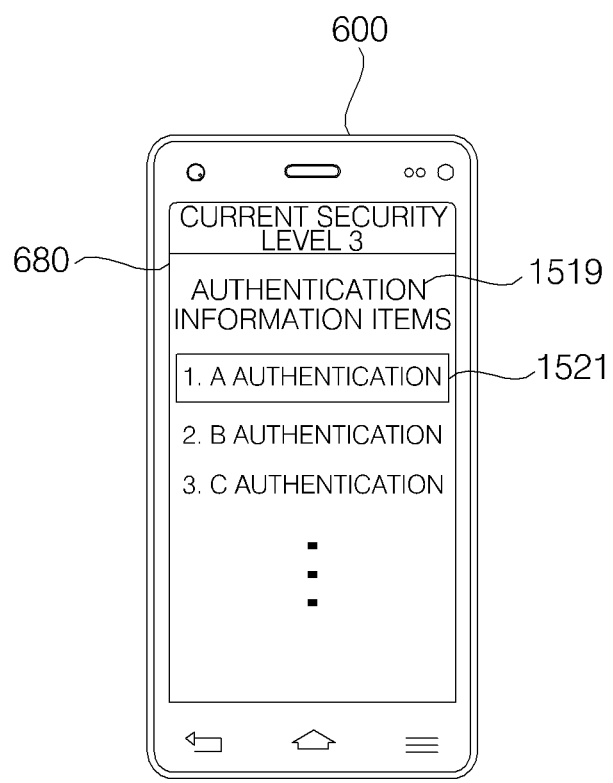

For example, when additional authentication is necessary, the controller 670 of the mobile terminal 600 may perform control such that a menu screen 1519 including a plurality of authentication information items is displayed, as shown in FIG. 15D.

In addition, when an "A" item 1521 is selected from among the plurality of items in the menu screen 1519, the controller 670 may perform control such that a sensor corresponding to the "A" item is activated to acquire authentication information corresponding to the "A" item.

When a second final security level score is equal to or greater than a first security level score required by a target service or a target external device, the controller 670 of the mobile terminal 600 may access to the target service or the target external device.

In addition, during the access to the target service or the target external device, the controller 670 of the mobile terminal 600 may receive relevant data from a service provider or an external device and may perform control such that display a screen related to the target service or the target external device.

Figure 15E:
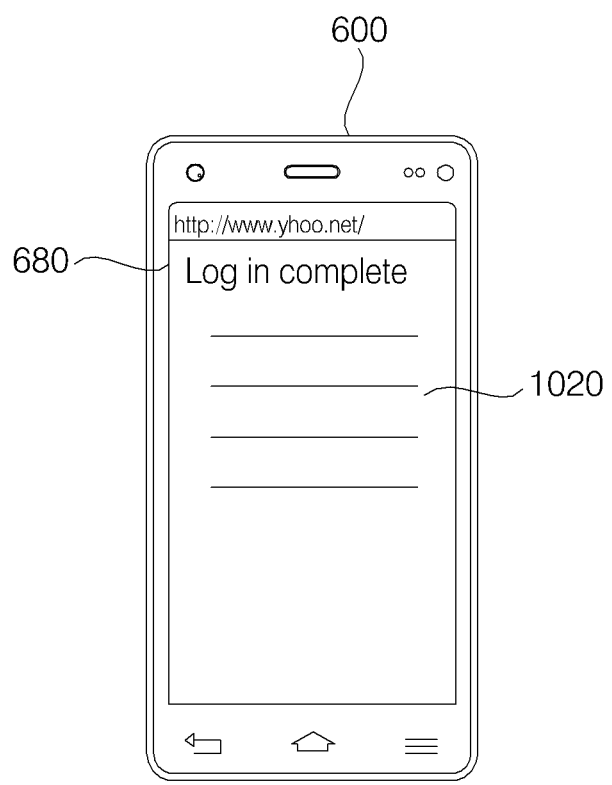

FIG. 15E shows an example in which a login completion screen 1020 is displayed as a login process is performed on the web login screen of FIG. 15A due to addition of fingerprint authentication information.

Accordingly, by accessing a web server, the controller 670 of the mobile terminal 600 may perform control such that data for displaying a web screen is received and the login completion screen 1020 is displayed based on the received data.

Meanwhile, the controller 670 of the mobile terminal 600 may compare received at least one authentication information with authentication information stored in the memory 160. If the received at least one authentication information coincides with the authentication information stored in the memory 160, the controller 670 of the mobile terminal 600 may perform control such that a security level score for the corresponding authentication information is reset or a calculated final security score is reset.

Figure 15F:
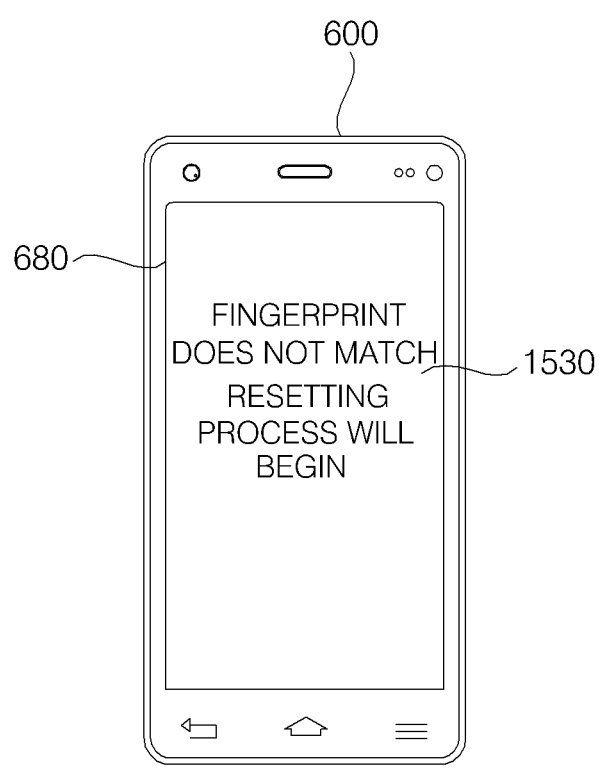

FIG. 15F shows an example in which a message 1530 notifying that a fingerprint does not match is output when fingerprint authentication information based on a fingerprint image acquired by the fingerprint sensor 642 does not coincide with fingerprint authentication information stored in the memory.

Figure 15G:
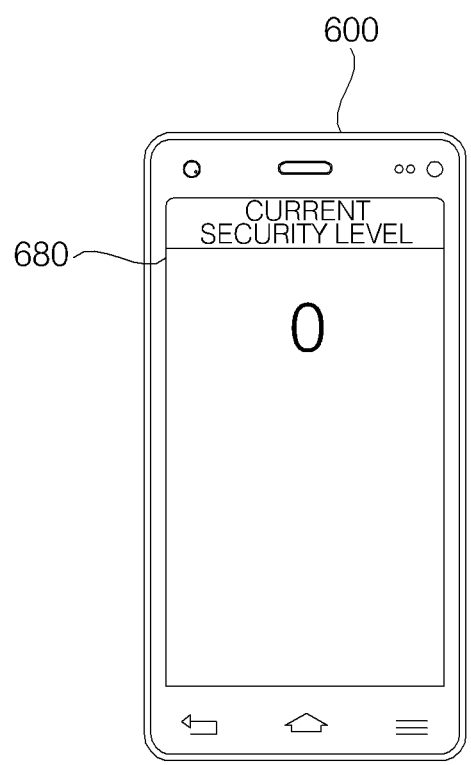

Meanwhile, if the fingerprint authentication information based on the acquired fingerprint image does not coincide with the pre-stored fingerprint authentication information, the controller 670 of the mobile terminal 600 may set a final security level score to 0, as shown in FIG. 15G.

Meanwhile, unlike the examples shown in FIG. 15A to FIG. 15F, a final security level score may be output in various forms. For example, the final security level score may be output in the form of levels, such as Level 1, Level 2, and Level 3, in the form of gauge (for example, the higher the gauge, the higher security level), in the form of sound (the higher the volume of sound, the higher the security level), and in the form of luminescence of a display screen (the greater the luminescence, the higher the security level).

Figure 16A:
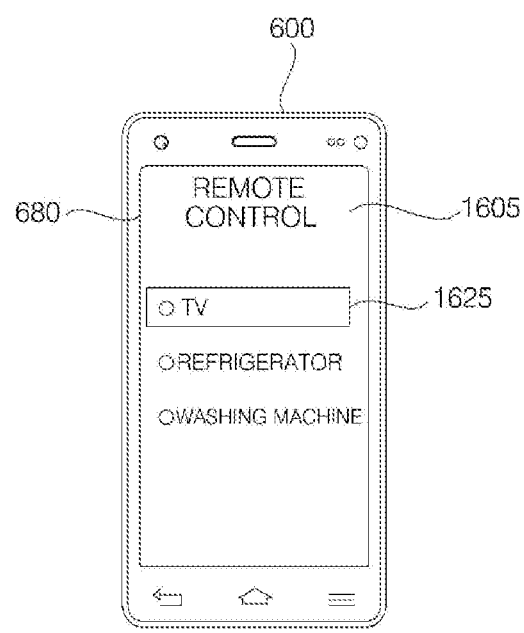

Meanwhile, the controller 670 of the mobile terminal 600 may display a remote control screen 1625 for an external device, as shown in FIG. 16A.

The remote control screen 1625 may include a plurality of remote control subject items. In the drawing, there are exemplary items such as a TV, a refrigerator, and a washing machine.

For example, when a TV item 1625 is selected from the remote control screen 1625, the controller 670 of the mobile terminal 600 may check the current final security level score, and determine whether the current final security level score is equal to or greater than a security level score required to remotely control a TV.

Figure 16B:
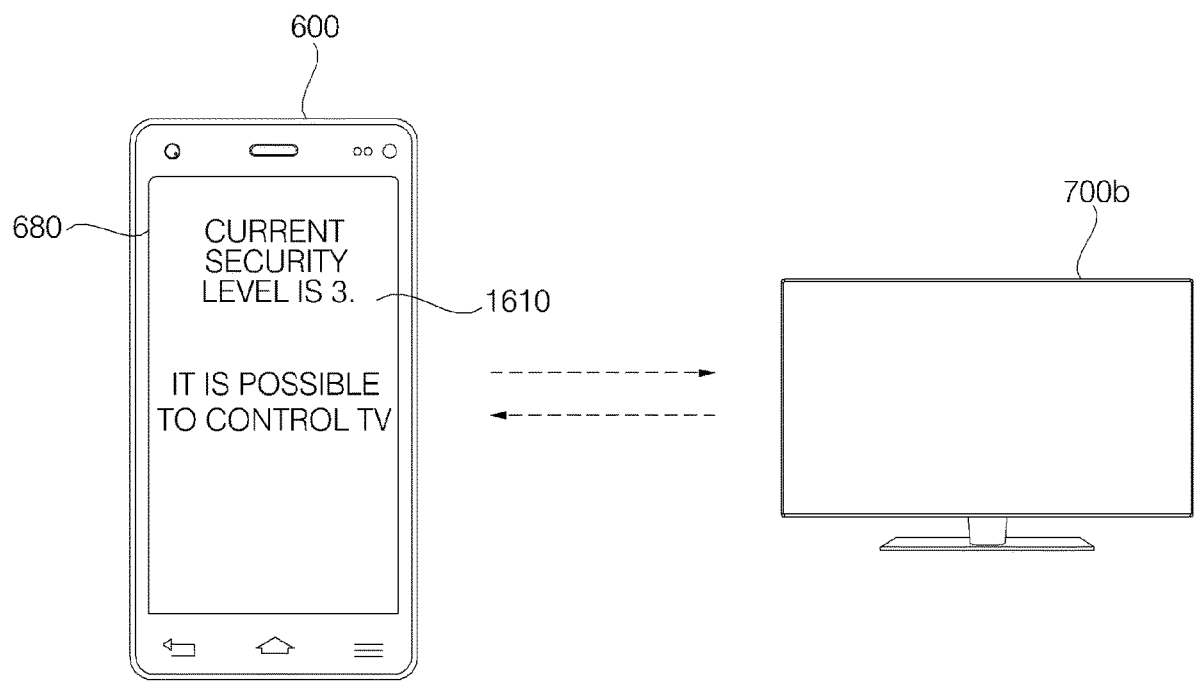

In addition, the controller 670 of the mobile terminal 600 may perform control such that a message 1610 notifying availability of remote control of a TV is output, as in FIG. 16B, and paring with the TV 700b is performed.

Figure 16C:
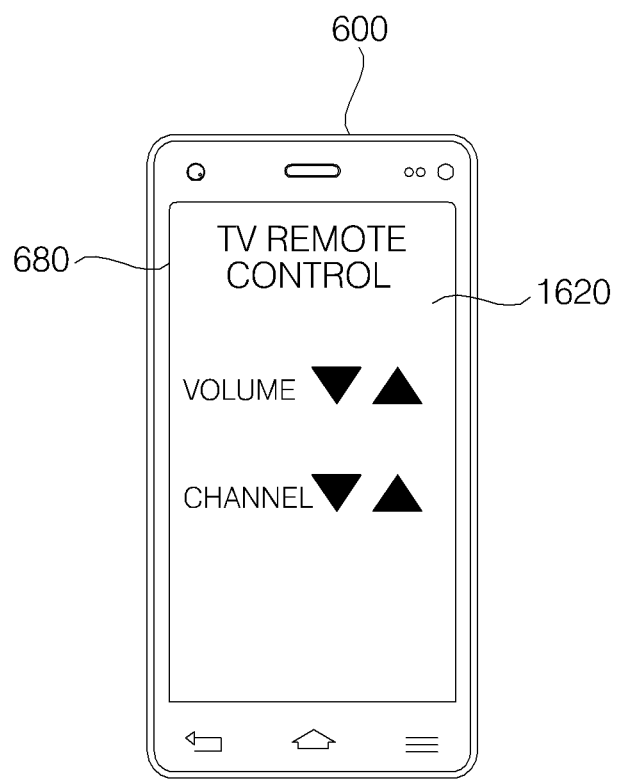

When pairing with the TV 700b is completed, the controller 670 of the mobile terminal 600 may perform control such that a remote control screen 1620 for remote controlling the TV 700b is displayed, as shown in FIG. 16C.

The remote control screen 1620 may include a volume item, a channel item, a power on/off item, etc.

Figure 17A:
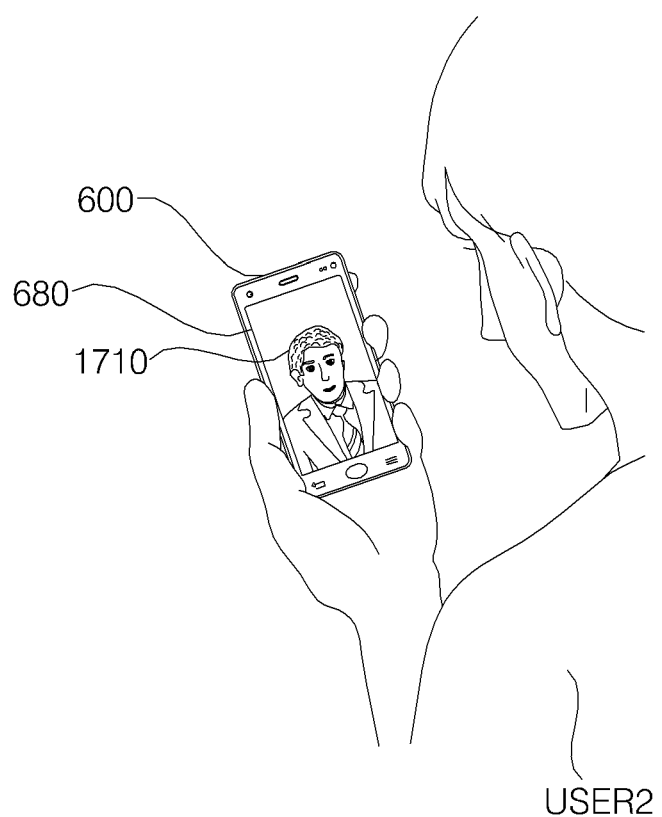
Figure 17B:
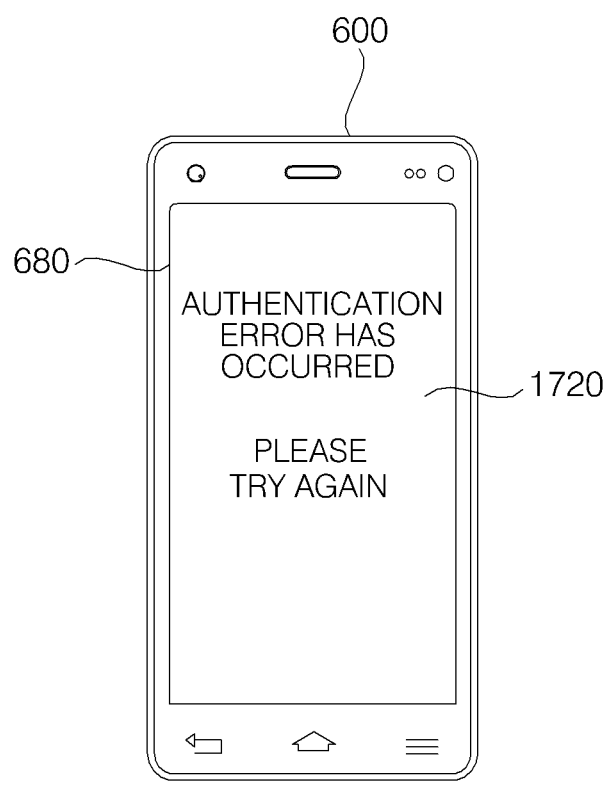

FIG. 17A shows an example in which the camera 695 of the mobile terminal 600 is activated and a second user carries out face authentication.

Specifically, FIG. 17A shows an example in which an image 1710 acquired by the camera 695 of the mobile terminal 600 is displayed on the display 680.

The controller 670 of the mobile terminal 600 compares received at least one authentication information with authentication information stored in the memory 160. If the at least one authentication information does not coincide with the authentication information stored in the memory 160, the controller 670 of the mobile terminal 600 may perform control such that a message 1720 notifying that authentication needs to be performed again is output.

Figure 17C:
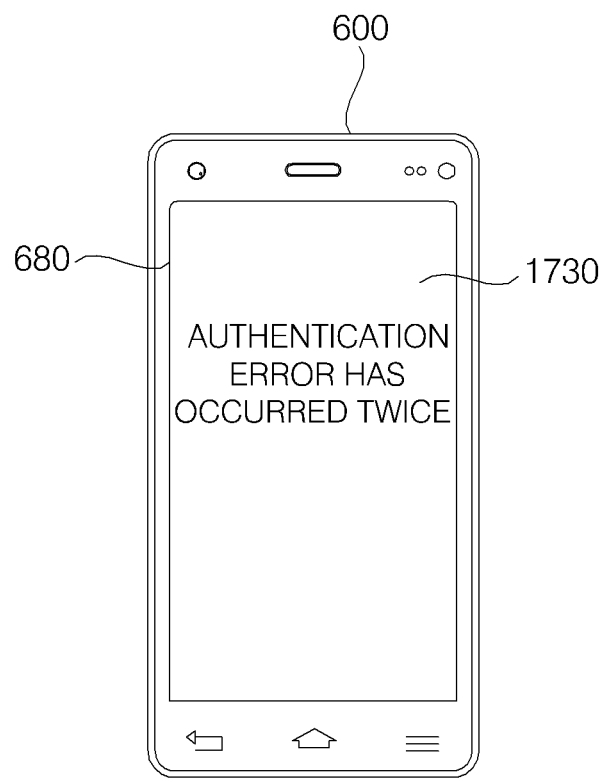
Figure 17D:
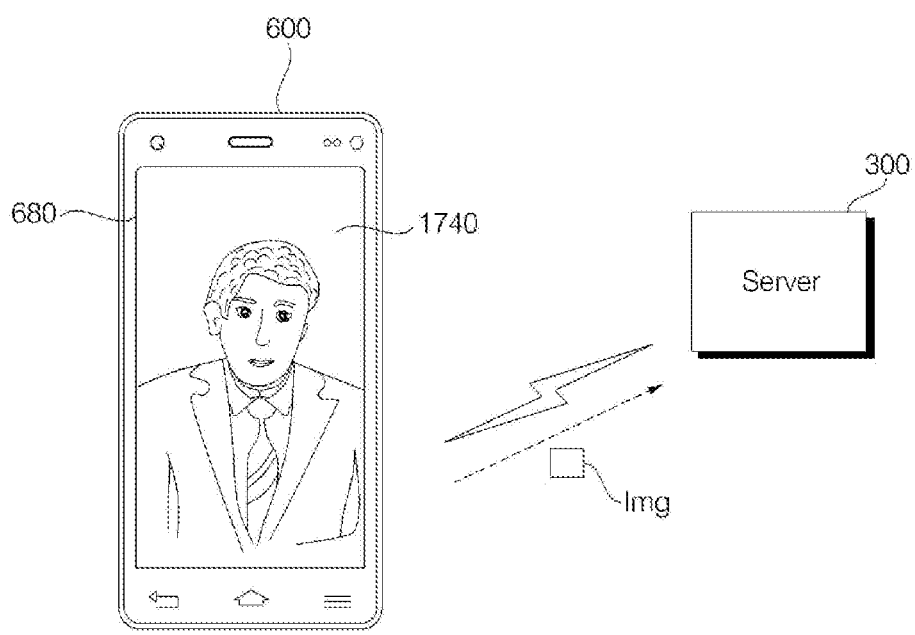

Meanwhile, FIG. 17C shows an example in which a message 1730 notifying two times of occurrence of a face authentication error is output.

Meanwhile, if the authentication error has occurred a predetermined number of times or more, the controller 670 of the mobile terminal 600 may determine that the authentication error has occurred due to an access attempt by an unauthorized user. Then, the controller 670 of the mobile terminal 600 may perform control such that an image (img) captured by the camera 695 is transmitted to a predetermined external device.

The predetermined external device may be a server managed by a manufacturer or a mobile carrier or may be another mobile terminal registered in the mobile terminal 600 as an emergency contact.

Meanwhile, although not illustrated in the drawings, the controller 670 of the mobile terminal 600 may perform control such that recommendation information about an executable service or a remote controllable external device is provided based on the current final security level score.

The final security level score may be reduced over time. The controller 670 of the mobile terminal 600 may provide recommendation information about an executable service or a remote controllable external device by changing the recommendation information on the basis of hour.

Although embodiments have been described with reference to a number of illustrative embodiments thereof, it should be understood that numerous other modifications and embodiments can be devised by those skilled in the art that will fall within the spirit and scope of the principles of this disclosure. In addition to variations and modifications in the component parts and/or arrangements, alternatives uses will also be apparent to those skilled in the art.

What is claimed is:

1. An electronic device comprising:
a plurality of sensors;
a communication device; and
a controller configured to:
   activate at least one of the plurality of sensors based on a received activation signal;
   generate at least one authentication information based on sensing performed by the activated at least one sensor;
   calculate a total security level score based on a security level score corresponding to the at least one authentication information;
   determine whether a target service or a target external device is accessible based on the total security level score; and
   in response to authentication errors that occur a predetermined number of times or more when an image captured by a camera among the plurality of sensors does not coincide with a prestored image, cause the communication device to transmit the image to a predetermined external device,
   when a first sensor and a second sensor among the plurality of sensors are activated, calculate the total security level score based on a first security level score corresponding to first authentication information based on a sensing signal of the first sensor and a second security level score corresponding to second authentication information based on a sensing signal of the second sensor,
   based on a determination that a first time lapse has occurred after generating the first authentication information, invalidate the first security level score from the total security level score, and deactivate the first sensor,
   recalculate the total security level score based on a third security level score corresponding to third authentication information based on a sensing signal of a third sensor, and
   based on a determination that a second time lapse has occurred after generating the second authentication information, invalidate the second security level score from the total security level score, and deactivate the second sensor.

2. The electronic device of claim 1, wherein:
the activation signal comprises an input signal for executing the target service requiring security authentication for access thereto; and
the plurality of sensors comprises at least one of:
   a camera used for at least one of iris authentication or face authentication;
   a fingerprint sensor used for fingerprint authentication;

a microphone used for at least one of voice recognition or glottal authentication;

a touch sensor used for usage pattern authentication;

an inertial sensor or a global positioning system (GPS) sensor used for location authentication; or an illumination sensor used for illumination authentication.

3. The electronic device of claim 1, further comprising an output device, wherein the controller is further configured to cause the output device to output a message requesting additional authentication information when the total security level score is less than a preset security level score required by the target service or the target external device.

4. The electronic device of claim 1, wherein the controller is further configured to:

activate an additional sensor among the plurality of sensors when the total security level score is less than a preset security level score required by the target service or the target external device;

generate additional authentication information based on sensing performed by the activated additional sensor;

recalculate the total security level score based on the security level score corresponding to the at least one authentication information and a security level score corresponding to the additional authentication information; and determine whether the target service or the target external device is accessible based on the total security level score.

5. The electronic device of claim 1, further comprising an output device, wherein the controller is further configured to:

cause the output device to output a plurality of indicator items when the total security level score is less than a preset security level score required by the target service or the target external device;

activate a sensor corresponding to one of the plurality of indicator items among the plurality of sensors in response to selection of the one of the plurality of indicator items;

generate additional authentication information based on the activated sensor;

recalculate the total security level score based on the security level score corresponding to the at least one authentication information and a security level score corresponding to the additional authentication information; and determine whether the target service or the target external device is accessible based on the total security level score.

6. The electronic device of claim 1, wherein the controller is further configured to:

selectively activate at least one additional sensor among the plurality of sensors that is currently inactive such that an updated total security level score that is equal to or greater than a preset security level score is generated when the total security level score is less than the preset security level score required by the target service or the target external device;

generate additional authentication information based sensing performed by the activated at least one additional sensor;

recalculate the total security level score based on the security level score corresponding to the at least one authentication information and a security level score corresponding to the additional authentication information; and determine whether the target service or the target external device is accessible based on the total security level score.

7. The electronic device of claim 1, wherein the controller is further configured to:

selectively activate at least one inactive authentication information in addition to the previously generated at least one authentication information when the total security level score is less than a preset security level score required by the target service or the target external device; and generate updated authentication information based on the selectively activated at least one authentication information and the previously generated at least one authentication information.

8. The electronic device of claim 1, wherein the controller is further configured to:

selectively activate at least one inactive authentication information in addition to the generated at least one authentication information such that an updated total security level score that is equal to or greater than a preset security level score is generated when the total security level score is less than the preset security level score required by the target service or the target external device; and generate additional authentication information based on the selectively activated at least one authentication information.

9. The electronic device of claim 1, wherein the controller is further configured to change the security level score corresponding to the at least one authentication information based on time lapse or occurrence of an event.

10. The electronic device of claim 1, wherein the controller is further configured to activate at least one additional sensor among the plurality of sensors when a sensing value obtained by the activated at least one sensor is equal to or less than a reference value.

11. The electronic device of claim 1, further comprising an input device, wherein the controller is further configured to activate at least one additional sensor among the plurality of sensors when a sensing value obtained by the activated at least one sensor is equal to or greater than a reference value or when an input signal is received from the input device.

12. The electronic device of claim 1, wherein the controller is further configured to deactivate at least one of the activated at least one sensor after accessing the target service or the target external device based on the total security level score.

13. The electronic device of claim 12, wherein the controller is further configured to activate the deactivated at least one sensor to access the target service or the target external device after the at least one sensor has been deactivated.

14. The electronic device of claim 12, wherein the controller is further configured to activate the deactivated at least one sensor and at least one additional sensor among the plurality of sensors to access the target service or the target external device or to access another service or another external device.

15. The electronic device of claim 1, further comprising a display, wherein the controller is further configured to:

access the target service or the target external device when the total security level score is equal to or greater than a preset security level score required by the target service or the target external device; and receive data from a provider of the target service or from the target external device and cause the display to display a screen related to the target service or the target external device while accessing the target service or the target external device.

16. The electronic device of claim 1, further comprising a display, wherein the controller is further configured to:
cause the communication device to transmit a data transmission request to a provider of the target service or transmit authentication data to the target external device or the provider of the target service when the total security level score is equal to or greater than a preset security level score required by the target service or the target external device;
cause the communication device to receive data from the provider of the target service or from the target external device; and
cause the display to display a screen related to the target service or the target external device based on the received data.

17. The electronic device of claim 1, wherein the controller is further configured to reduce the security level score corresponding to the at least one authentication information after a predetermined time passes or sequentially over time.

18. The electronic device of claim 1, further comprising a memory, wherein the controller is further configured to:
compare the at least one authentication information with authentication information pre-stored in the memory; and
reset the security level score corresponding to the at least one authentication information or the calculated total security level score when the at least one authentication information does match the authentication information pre-stored in the memory.

19. An electronic device comprising:
a plurality of sensors;
a communication device; and
a controller configured to:
activate at least one inactive sensor among the plurality of sensors when a current total security level score is less than a preset security level score required by a target service or a target external device;
generate at least one authentication information based on sensing performed by the activated at Last one sensor;
calculate the total security level score using the at least one authentication information;
determine whether the target service or the target external device is accessible based on the total security level score; and
in response to authentication errors that occur a predetermined number of times or more when an image captured by a camera does not coincide with a prestored image, cause the communication device to transmit the image to a predetermined external device,
when a first sensor and a second sensor among the plurality of sensors are activated, calculate the total security level score based on a first security level score corresponding to first authentication information based on a sensing signal of the first sensor and a second security level score corresponding to second authentication information based on a sensing signal of the second sensor,
based on a determination that a first time lapse has occurred after generating the first authentication information, invalidate the first security level score from a total security level score, and deactivate the first sensor,
recalculate the total security level score based on a third security level score corresponding to third authentication information based on a sensing signal of the third sensor, and
based on a determination that a second time lapse has occurred after generating the second authentication information, invalidate the second security level score from the total security level score, and deactivate the second sensor.

20. The electronic device of claim 19, further comprising a memory, wherein the controller is further configured to:
compare the at least one authentication information with authentication information pre-stored in the memory; and
reset a security level score corresponding to the at least one authentication information or the total security level score when the at least one authentication information does not match authentication information pre-stored in the memory.

* * * * *